(12) United States Patent
Wang et al.

(10) Patent No.: US 12,134,093 B2
(45) Date of Patent: Nov. 5, 2024

(54) SYSTEM AND METHOD FOR INTEGRATED SENSOR CARTRIDGE

(71) Applicant: MGI Tech Co., Ltd., Shenzhen (CN)

(72) Inventors: Liang Wang, Newark, CA (US); Cheng Frank Zhong, Menlo Park, CA (US); Shifeng Li, Fremont, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 792 days.

(21) Appl. No.: 17/293,389

(22) PCT Filed: Nov. 15, 2019

(86) PCT No.: PCT/CN2019/118655
§ 371 (c)(1),
(2) Date: May 12, 2021

(87) PCT Pub. No.: WO2020/098761
PCT Pub. Date: May 22, 2020

(65) Prior Publication Data
US 2021/0402391 A1     Dec. 30, 2021

Related U.S. Application Data

(60) Provisional application No. 62/767,998, filed on Nov. 15, 2018.

(51) Int. Cl.
*B01L 3/00* (2006.01)
*C09J 7/20* (2018.01)
(Continued)

(52) U.S. Cl.
CPC ... *B01L 3/502707* (2013.01); *B01L 3/502715* (2013.01); *C09J 7/20* (2018.01);
(Continued)

(58) Field of Classification Search
None
See application file for complete search history.

(56) References Cited

U.S. PATENT DOCUMENTS 6,443,179 B1 * 9/2002 Benavides .......... F16K 99/0042
137/454.2
6,720,149 B1    4/2004 Rava et al.
(Continued)

FOREIGN PATENT DOCUMENTS

CN     101405084 A     4/2009
CN     101947124 A     1/2011
(Continued)

OTHER PUBLICATIONS

European Application No. 19884216.3, Extended European Search Report mailed on Jul. 18, 2022, 8 pages.
(Continued)

*Primary Examiner* — Lore R Jarrett
(74) *Attorney, Agent, or Firm* — Kilpatrick Townsend & Stockton LLP

(57) ABSTRACT

A microfluidic apparatus (100) can include a PCB (110), a biological chip (120) overlying the PCB (110), and a microfluidic housing (130) overlying the biological chip (120) and the PCB (110). The microfluidic apparatus (100) also has a first adhesive layer (141) attaching the microfluidic housing (130) to the biological chip (120) and a second adhesive layer (142) attaching the microfluidic housing (130) to the PCB (110). The second adhesive layer (142) is thicker than the first adhesive layer (141). The first adhesive layer (141) comprises a first adhesive material, and the second adhesive layer (142) comprises a second adhesive material.

23 Claims, 14 Drawing Sheets

(51) Int. Cl.
*C09J 7/38* (2018.01)
*C09J 163/00* (2006.01)

(52) U.S. Cl.
CPC ............... *C09J 7/38* (2018.01); *C09J 163/00* (2013.01); *C09J 2203/326* (2013.01)

(56) References Cited

U.S. PATENT DOCUMENTS

| | | | |
|---|---|---|---|
| 2008/0096216 A1 | 4/2008 | Quake | |
| 2010/0098585 A1 | 4/2010 | Chiu et al. | |
| 2010/0099582 A1 | 4/2010 | Chiu et al. | |
| 2013/0050155 A1* | 2/2013 | Petersen | B81B 7/0067 345/204 |
| 2014/0077315 A1 | 3/2014 | Bischopink | |
| 2015/0212031 A1 | 7/2015 | Reed et al. | |
| 2017/0326546 A1* | 11/2017 | Peumans | A61K 9/0014 |
| 2018/0129848 A1* | 5/2018 | Wang | H01L 23/293 |

FOREIGN PATENT DOCUMENTS

| | | |
|---|---|---|
| CN | 101948741 A | 1/2011 |
| CN | 102206573 A | 10/2011 |
| CN | 102277294 A | 12/2011 |
| CN | 103589631 A | 2/2014 |
| CN | 103937658 A | 7/2014 |
| CN | 106391153 A | 2/2017 |
| CN | 106459869 A | 2/2017 |
| CN | 207904239 U | 9/2018 |
| JP | 2010501076 A | 1/2010 |
| JP | 2010127931 A | 6/2010 |
| JP | 2011220996 A | 11/2011 |
| TW | 201211244 A | 3/2012 |
| TW | I618932 B | 3/2018 |
| TW | I624543 B | 5/2018 |
| WO | 2015138648 A1 | 9/2015 |

OTHER PUBLICATIONS

Japanese Application No. 2021-526606, Office Action mailed on Aug. 16, 2023, 4 pages (2 pages of Original Document and 2 pages of English Translation).
PCT/CN2019/118655, "International Search Report and Written Opinion", Jan. 31, 2020, 7 pages.

* cited by examiner

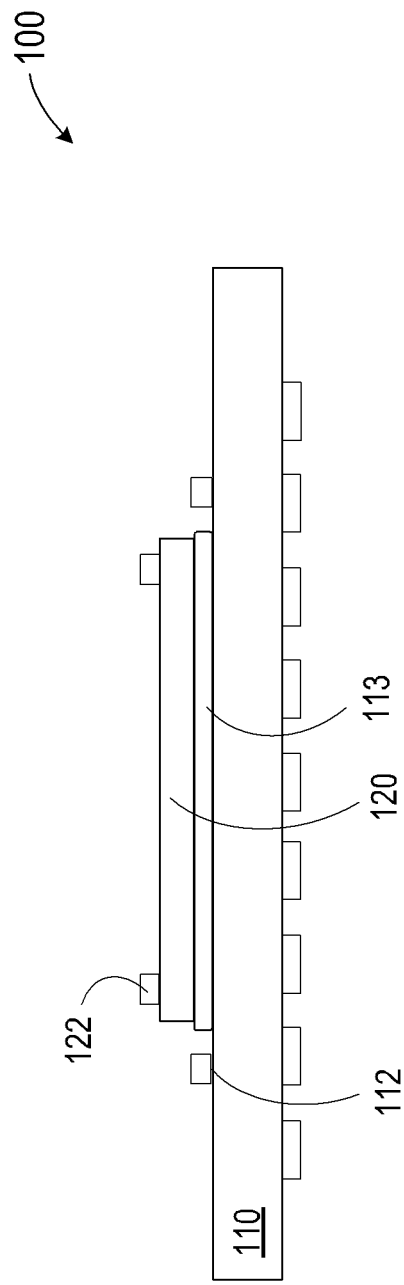
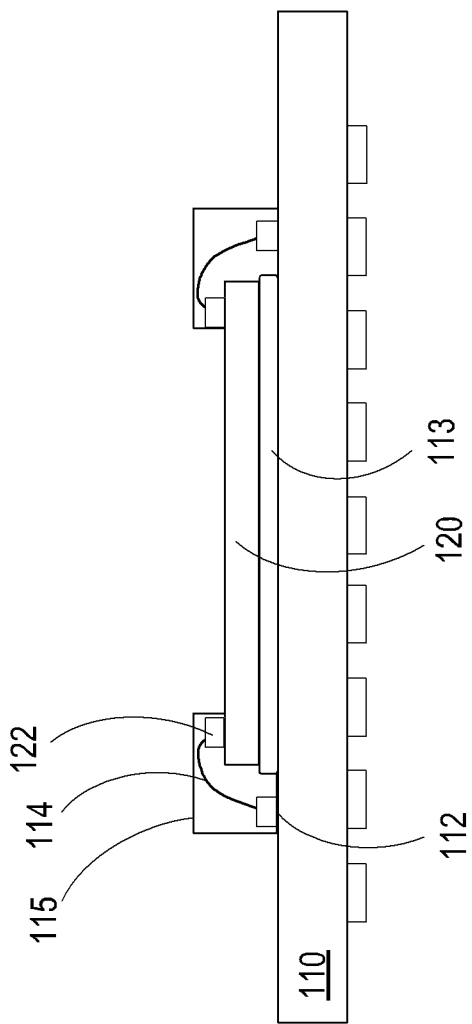

SYSTEM AND METHOD FOR INTEGRATED SENSOR CARTRIDGE

CROSS-REFERENCES TO RELATED APPLICATIONS

This application claims priority to and is a 371 application of PCT Application No. PCT/CN2019/118655, filed Nov. 15, 2019, which claims benefit of U.S. Provisional Patent Application No. 62/767,998, filed Nov. 15, 2018, the content of which is incorporated by reference in its entirety.

FIELD

The present invention relates generally to a biosensor for biological or chemical analysis, and more specifically, to methods of integrating a microfluidic housing with a biological chip and a substrate, such as a printed circuit board (PCB), to form an integrated sensor cartridge or a microfluidic apparatus.

BACKGROUND OF THE INVENTION

High-throughput analysis of chemical and/or biological species is an important tool in the fields of diagnostics and therapeutics. Arrays of attached chemical and/or biological species can be designed to define specific target sequences, analyze gene expression patterns, identify specific allelic variations, determine copy number of DNA sequences, and identify, on a genome-wide basis, binding sites for proteins (e.g., transcription factors and other regulatory molecules). In a specific example, the advent of the human genome project required that improved methods for sequencing nucleic acids, such as DNA (deoxyribonucleic acid) and RNA (ribonucleic acid), be developed. Determination of the entire 3,000,000,000 base sequence of the haploid human genome has provided a foundation for identifying the genetic basis of numerous diseases.

High-throughput analyses, such as massively parallel DNA sequencing, often utilize flow cells, which contain arrays of chemicals and/or biological species available for analysis. Flow cells are often made with a microfluidic housing integrated with a biological chip, such as a silicon-based sensor chip, to form microfluidic apparatus, such as a cartridge. The manufacture and use of many current microfluidic designs can be complicated and costly, and are often unreliable.

BRIEF SUMMARY OF THE INVENTION

Embodiments of the invention include methods and apparatus for integrating a microfluidic housing with a biological chip and substrate, such as a printed circuit board (PCB), to form an integrated microfluidic apparatus with hermetic seal of flow cell and reliable performance.

In some embodiments, in the microfluidic apparatus, a first glue is used to bond the microfluidic housing with the biological chip to form a hermetic seal of the flow cell, and a second glue to bond the microfluidic housing with the PCB to provide mechanical support. The types and properties of the glues and the structure of the microfluidic apparatus are designed to provide hermetic seal for the flow cell, reliable device structure, and a wide process window. Many advantages can be realized over conventional methods for assembling a microfluidic apparatus or cartridge. Depending on the specific embodiments, the apparatus can provide many advantages. For example, the apparatus can accommodate variations of sensor thickness, variations of die attach glue thickness, and variations of the PCB front surface. The device can minimize the stress on the first glue, accommodate the mismatched thermal expansion between the sensor and microfluidic apparatus through thermal cycles during operation, and improve flow cell's fluid field uniformity.

In some embodiments of the above microfluidic apparatus, the first adhesive material is a solid before curing and substantially maintains its thickness after curing to provide accuracy and uniformity of the height of the microfluidic apparatus. The second adhesive material is a liquid before curing to adjust for variations in the distance between a bottom surface of the outer sidewall and the PCB. In some embodiment, he second adhesive material has a higher curing shrinkage than the first adhesive material. In some embodiments, the first adhesive material includes a die attach film (DAF), and the second adhesive material includes liquid epoxy.

In some embodiments of the above microfluidic apparatus, the first adhesive material is a compliant adhesive after curing to accommodate mismatched thermal expansion between biological chip and the microfluidic housing through thermal cycles during operation. The second adhesive material is in liquid form before curing. In some embodiments, the first adhesive material includes a compliant urethane adhesive material, and the second adhesive material includes liquid epoxy. In alternative embodiments, the first adhesive material includes a pressure sensitive adhesive (PSA), and the second adhesive material comprises liquid epoxy.

In some embodiments, the first adhesive material and the second adhesive material are cured through different curing processes, such as heat, moisture or ultraviolet illumination curing.

In some embodiments, the biological chip can include a biological sensor chip.

In some embodiments, the microfluidic housing includes one or more of second cavities between the inner sidewall and the outer sidewall for accommodating bonding wires coupling the biological chip and the PCB. In some embodiments, die attach adhesive layer is used to attach the biological chip to the PCB.

In some embodiments, the microfluidic apparatus also has a second biological chip attached to the PCB. In some embodiments, the second biological chip includes a biosensor. In some embodiments, the second biological chip includes a fluidic droplets generating device.

In some embodiments, the microfluidic apparatus also has an integrated circuit chip attached to the PCB. In some embodiments, the integrated circuit chip includes a processor.

In some embodiments, the microfluidic apparatus also has a micro-electro-mechanical-system (MEMS) chip attached to the PCB. In some embodiments, the MEMS chip includes an actuator for initiating an action in response to a signal detected in the biological chip.

In some embodiments, the second adhesive layer includes an opening for testing of the hermeticity of the first adhesive layer. In an alternative embodiments, the microfluidic housing includes an opening for testing of the hermeticity of the first adhesive layer.

According to some alternative embodiments of the present invention, a microfluidic apparatus can include a PCB (printed circuit board), a biological chip overlying the PCB, and a microfluidic housing overlying the biological chip and the PCB. The microfluidic apparatus may also have a first adhesive layer attaching the microfluidic housing to the biological chip and a second adhesive layer attaching the microfluidic housing to the PCB. The second adhesive layer may be thicker than the first adhesive layer. The first adhesive layer comprises a first adhesive material, the second adhesive layer comprises a second adhesive material.

In some embodiments of the above microfluidic apparatus, the microfluidic housing includes an inlet, an outlet, and a first cavity. The microfluidic housing has an inner sidewall adjacent to the first cavity and the inner sidewall being attached to the biological chip using a first adhesive layer to form a flow cell, the microfluidic housing having an outer sidewall attached to the PCB using a second adhesive layer.

According to some embodiments of the invention, a method for making a microfluidic apparatus includes providing a PCB (printed circuit board), attaching a biological chip to the PCB, providing a microfluidic housing, disposing first and second adhesive materials. The first adhesive material for attaching the microfluidic housing to the biological chip and the second adhesive material for attaching the microfluidic housing to the PCB. The second adhesive material is in liquid form before curing, and the second adhesive material has a higher curing shrinkage than the first adhesive material. The method also includes attaching the microfluidic housing to the biological chip using the first adhesive material and attaching the microfluidic housing to the PCB using the second adhesive material. The method further includes curing the first and second adhesive materials to form first and second adhesive layers, respectively.

In some embodiments of the above method, the microfluidic housing includes an inlet, an outlet, and a first cavity. The microfluidic housing has an inner sidewall adjacent to the first cavity and the inner sidewall being attached to the biological chip using a first adhesive layer to form a flow cell, the microfluidic housing having an outer sidewall attached to the PCB using a second adhesive layer.

In some embodiments of the above method, the first adhesive material is a solid before curing and substantially maintains its thickness after curing to provide accuracy and uniformity of the height of the microfluidic apparatus. The second adhesive material is a liquid before curing to adjust for variations in the distance between a bottom surface of the outer sidewall and the PCB. In some embodiment, he second adhesive material has a higher curing shrinkage than the first adhesive material. In some embodiments, the first adhesive material comprises a die attach film (DAF), and the second adhesive material comprises liquid epoxy.

In some embodiments of the above method, the first adhesive material is a compliant adhesive after curing to accommodate mismatched thermal expansion between biological chip and the microfluidic housing through thermal cycles during operation. The second adhesive material is in liquid form before curing. In some embodiments, the first adhesive material comprises a compliant urethane adhesive material, and the second adhesive material comprises liquid epoxy. In some embodiments, the first adhesive material comprises a pressure sensitive adhesive (PSA), and the second adhesive material comprises liquid epoxy.

A further understanding of the nature and advantages of the present invention may be realized by reference to the remaining portions of the specification and the drawings.

BRIEF DESCRIPTION OF THE DRAWINGS

FIGS. 3A-3I are cross-sectional view diagrams illustrating the method summarized in the flowchart of FIG. 2 according to some embodiments of the present invention;

FIG. 3A is a cross-sectional view diagram illustrating a printed circuit board (PCB) that can be used in the method of FIG. 2;

FIG. 3B is a cross-sectional view diagram illustrating a die attach glue formed on a PCB that can be used in the method of FIG. 2;

FIG. 3C is a cross-sectional view diagram illustrating a biological chip attached to a PCB that can be used the method of FIG. 2;

FIG. 3D is a cross-sectional view diagram illustrating wire bonds formed to electrically connect the biological chip and the PCB;

FIG. 3E is a cross-sectional view diagram illustrating a microfluidic housing according to some embodiments of the present invention;

FIG. 3F is a cross-sectional view diagram illustrating relative dimensions of the microfluidic housing and the PCB according to some embodiments of the present invention;

FIG. 3G is a cross-sectional view diagram illustrating adhesive layers being disposed on the biological chip and the PCB according to some embodiments of the present invention;

FIG. 3H is a cross-sectional view diagram illustrating adhesive layers being disposed on the microfluidic housing according to some embodiments of the present invention;

FIG. 3I is a cross-sectional view diagram illustrating the microfluidic housing being attached to the biological chip and the PCB according to some embodiments of the present invention;

DETAILED DESCRIPTION OF THE INVENTION

Figure 1:
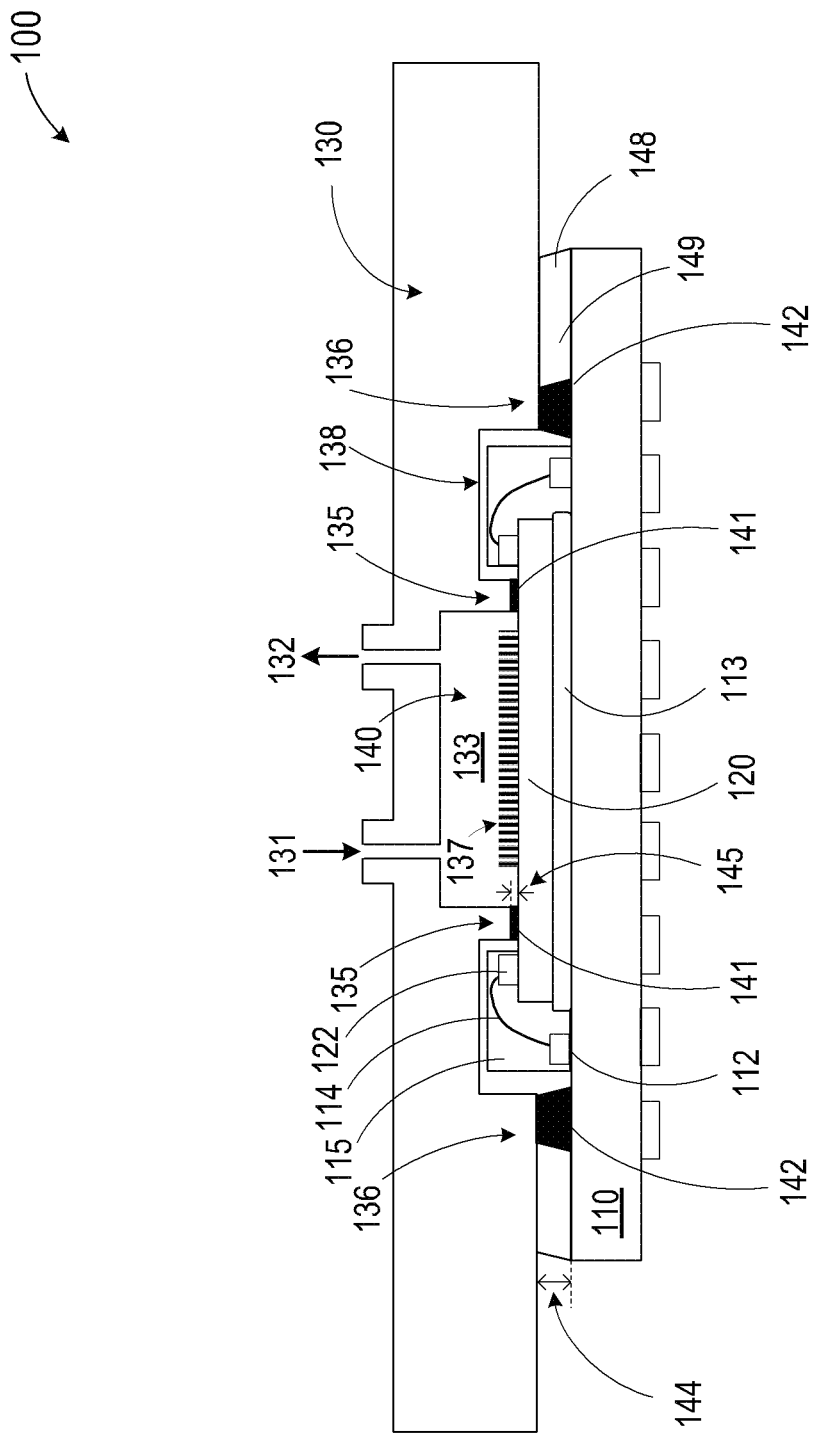
FIG. 1 is a simplified cross-sectional view diagram illustrating a microfluidic apparatus according to some embodiments of the present invention.

FIG. 1 is a simplified cross-sectional view diagram illustrating a microfluidic apparatus according to some embodiments of the present invention. As shown in FIG. 1, microfluidic apparatus 100 includes a substrate 110, such as a PCB (printed circuit board), a biological chip 120 overlying the PCB 110, and a microfluidic housing 130 overlying the biological chip 120 and the PCB 110. The microfluidic housing 130 is attached to the biological chip 120 using a first adhesive layer 141 to form a flow cell, and the microfluidic housing is attached to the PCB 110 using a second adhesive layer 142 to provide mechanical support. The biological chip 120 can be attached to the PCB 110, for example, using a die attach adhesive layer 113 that attaches the biological chip 120 to the PCB 110. It will be appreciated that the substrate described herein is not limited to the PCB, and other substrate can also be used, for example, semiconductor (e. g., silicon) substrate, glass substrate, ceramic substrate, etc.

The biological chip 120 can include devices that manipulate or analyze biological or chemical samples, such as sensors, actuators, etc. In some cases, the sensor and the actuator can include one or more MEMS devices. As an example, a biological chip can be configured to detect a signal from a biological sample, and a processor can process the detected signal and respond to the signal by triggering an actuator. Depending on the embodiments, the PCB 110 can be used to connect multiple biological chips with other circuit components, such as processors, control devices, storage devices, I/O devices, and communication devices, etc.

In FIG. 1, the microfluidic housing 130 has an inlet 131, an outlet 132, and a first cavity 133. The microfluidic housing 130 can have an inner sidewall 135 adjacent to the cavity 133, and the inner sidewall is attached to the biological chip 120 using the first adhesive layer 141 to form a flow cell 140 with a hermetic seal. As used herein, a hermetic seal refers to a sealing that is airtight and liquid tight, which excludes the passage of air, gases, and liquids. The flow cell 140 includes a channel formed by the cavity 133 between the microfluidic housing 130, inner sidewalls 135 of the microfluidic housing, and the biological chip 120. The flow cell 140 also has an inlet 131 and an outlet 132. As an example of the application, a biological sample 137 can be introduced through the inlet 131 into the cavity 133, where the sensors in biological chip 120 can determine the properties of the biological sample 137. Afterwards, the biological sample 137 can be removed from the cavity 133 through the outlet 132.

As shown in FIG. 1, the microfluidic housing 130 can also have an outer sidewall 136 attached to the PCB 110 using a second adhesive layer 142 to provide mechanical support. In some embodiments, the biological chip 120 is electrically coupled to the PCB 110 using wire bonds. In FIG. 1, a contact pad 122 on the biological chip is connected to a contact pad 112 on the PCB with a bond wire 114. The contact pad 122, contact pad 112, and bond wire 114 can be encapsulated in a wire bond protection structure 115. In this regard, the microfluidic housing 130 can also include second cavities 138 for accommodating wire bonds. A gap 148 between the microfluidic housing 130 and the PCB 110 can be filled with an underfill material 149, which can be an epoxy material to provide a compliant layer between the package and PCB.

The first adhesive layer 141 forms a hermetic seal between the microfluidic housing 130 and the biological chip 120 that is air tight and liquid tight. Further, the first adhesive layer 141 is compatible with the materials used in the flow cell. On the other hand, the second adhesive layer 142 is configured to provide mechanical strength in the joint between the microfluidic housing 130 and the PCB 110. In some examples, the second adhesive layer 142 is thicker than the first adhesive layer 141. The distance 144 between a bottom surface of the outer sidewall 136 of the microfluidic housing and the PCB 110 is greater than the distance 145 between a bottom surface of the inner sidewall 135 of the microfluidic housing and the biological chip 120.

In some embodiments, for bonding the microfluidic housing 130 to the biological chip 120 and the PCB 110, the first and second adhesive layers are first formed, and then the microfluidic housing 130 is picked up and disposed to contact the biological chip 120 and the PCB 110. In some embodiments, the microfluidic apparatus is designed in a way that the first adhesive layer can be in a solid form and can have a well-defined thickness. On the other hand, the second adhesive layer is sufficiently thick and is in liquid form before curing so that the second adhesive layer's bond line thickness is self-adjustable. In other words, it can fill the space required by the structure of the microfluidic apparatus, which can be influenced by the first adhesive layer thickness, sensor thickness, die attach glue thickness, PCB surface unevenness, and the step of wire bond cavity in the microfluidic apparatus, etc. Here, the bond line thickness refers to the thickness of an adhesive layer between the bottom surface of the device structure above the adhesive layer and the top surface of the device structure below the adhesive layer. Depending on the context, the term "bond line thickness" can refer to a pre-cure bond line thickness or a post-cure bond line thickness of an adhesive layer.

In some embodiments, the first adhesive material substantially maintains its thickness through a curing process to maintain the uniformity of the height of the microfluidic apparatus and to ensure the flow cell's fluid field uniformity. In a specific embodiment, the first adhesive material can be a die attach film (DAF). The die attach film is a solid adhesive before curing and substantially maintains its thickness after curing.

In some embodiments, the first adhesive material can be a compliant adhesive, also referred to as a stress-compliant adhesive, after curing. In these cases, the constant thickness of the first adhesive material is not needed to maintain the structural uniformity of the microfluidic apparatus. The compliant adhesive can be used to accommodate mismatched thermal expansion between the biological chip and the microfluidic housing through thermal cycles during operation. Therefore, it is desirable for the first adhesive to undergo elastic elongation without non-recoverable deformation or creep. In some embodiments, the first adhesive material can have elongation of great than 0.5% of its thickness before creep. For example, the compliant first adhesive material can be a urethane adhesive material made by Bostik. As another example, the compliant first adhesive can be a pressure sensitive adhesive (PSA).

As described above, FIG. 1 illustrates an example of a microfluidic apparatus having a single biological chip bonded to a PCB. However, the features described above are not limited to a microfluidic apparatus having a single chip, and the chip is not necessarily a biological chip, as explained further below.

Figure 2:
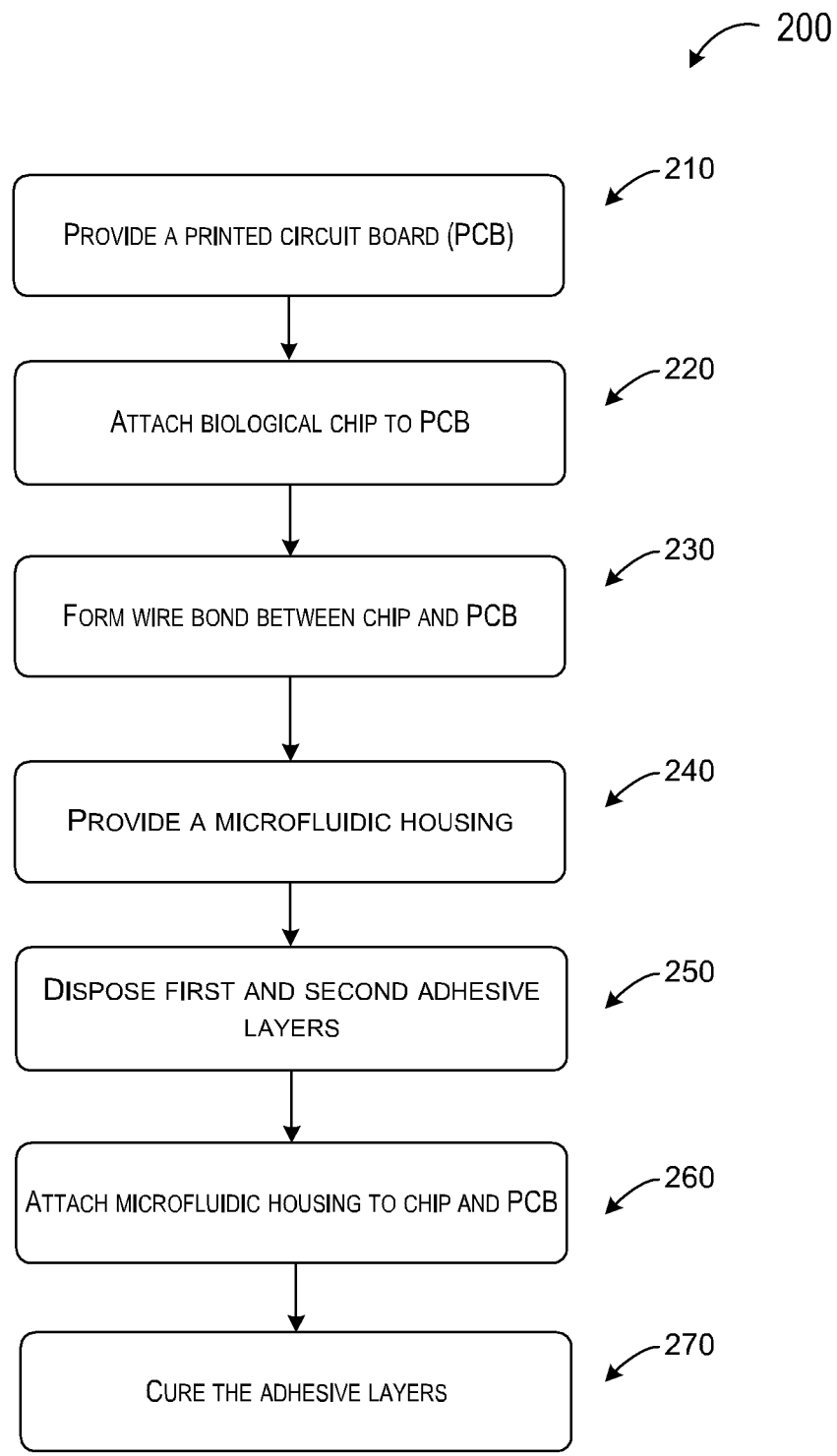
FIG. 2 is a flowchart illustrating a method for forming a microfluidic apparatus according to some embodiments of the present invention.

FIG. 2 is a flowchart illustrating a method for forming a microfluidic apparatus according to some embodiments of the present invention. FIGS. 3A-3K are cross-sectional view diagrams illustrating the method summarized in the flowchart of FIG. 2 according to some embodiments of the present invention. The method for forming a microfluidic apparatus, such as microfluidic apparatus 100 of FIG. 1 is now described with reference to the flowchart of FIG. 2 and the cross-sectional view diagrams in FIGS. 3A-3K.

As shown in FIG. 2, method 200 for forming a microfluidic apparatus can be summarized as follows.

At 210—Provide a printed circuit board (PCB);

At 220—Attach a biological chip to the PCB;

At 230—Form wire bond between the biological chip and the PCB;

At 240—Provide a microfluidic housing;

At 250—Dispose the first and second adhesive layers:

At 260—Attach the microfluidic housing over the biological chip and PCB; and At 270—Cure the adhesive layers.

These processes are described in detail below.

Figure 3A:
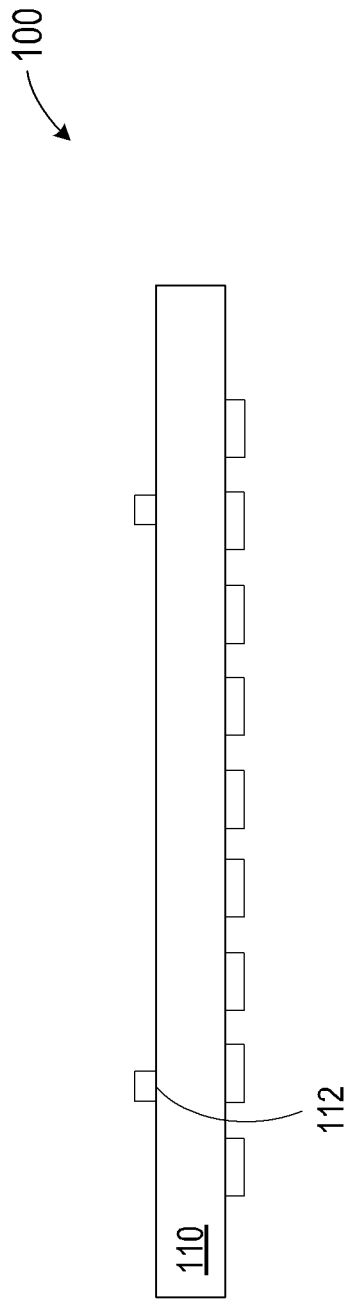

In process 210, the method 200 starts with providing a printed circuit board (PCB) 110. FIG. 3A is a cross-sectional view diagram illustrating a printed circuit board (PCB) that can be used in the method of FIG. 2. The PCB can include bonding pads for making electrical connections with the electronic components on the circuit board. For example, FIG. 3A shows a contact pad 112, which can be used as a bonding pad, for coupling to the biological chip.

Figure 3B:
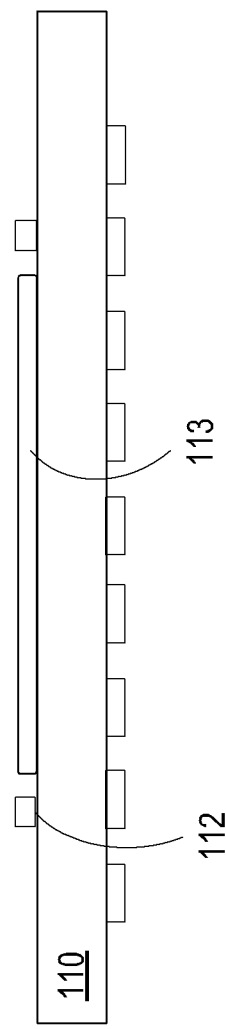

In process 220, method 200 includes attaching a biological chip to the PCB. FIG. 3B is a cross-sectional view diagram illustrating a die attach glue formed on a printed circuit board (PCB) that can be used in the method of FIG. 2. FIG. 3C is a cross-sectional view diagram illustrating a biological chip attached to a printed circuit board (PCB) that can be used in the method of FIG. 2. In FIG. 3B, an adhesive layer 113, or die attach glue, can be an epoxy base adhesive for attaching a chip to the PCB. Next, as shown in FIG. 3C, a biological chip 120 is attached to PCB 110 using the adhesive layer 113.

The biological chip 120 can include devices that handle or analyze biological or chemical samples. As used herein, a "biological chip" refers to a structure with which a biological molecule(s) associate(s), is immobilized, or is captured, for analysis. Typically a biological chip comprises an array of binding sites, where each binding site can be independently occupied by a biological molecule such as a protein, nucleic acid, antibody, polysaccharide, or the like. Typically, detectable signals generated at one or many binding sites can be detected. For example, an enzymatic, binding, or chemical reaction at one binding site may produce a detectable signal, such as a fluorescent or chemiluminescent emission, which is detected and identifies a feature or characteristic of the biological molecule at that site. As described herein below, biological chips may be used for nucleic acid sequencing. In some cases the biological chip can include a sensor (i.e., a biological sensor). As used herein, the term "biosensor" or "biological sensor" may be used to refer to an apparatus for determining a light emitting substance within or attached to a biological molecule, particularly a nucleic acid macromolecule exemplified by DNA and branched or otherwise derivatized nucleic acids. In an example, a biological chip can detect a signal, such as a fluorescent or chemiluminescent signal, from a biological sample, and a processor can process the detected signal and respond to the signal by triggering an actuator. Examples of biological chips can include CMOS biological sensors described in U.S. patent application Ser. No. 16/128,120, filed Sep. 11, 2018, which is herein incorporated by reference in its entirety. For instance, a biological sensor can include flow cells overlying a complementary metal-oxide-semiconductor (CMOS) layer. The CMOS layer can include a photo sensing layer having a plurality of photodiodes, and an electronic circuit layer coupled to the photo sensing layer for processing sensed signals. Other examples of biological chips can also include micro droplets handling chips, such as the integrated lab-on-a-chip cartridge described in described in U.S. patent application Ser. No. 12/513,157, filed Nov. 1, 2007, U.S. Pat. Published App. No. 20100096266, published Apr. 22, 2010, which is herein incorporated by reference in its entirety. It will be appreciated that the microfluidic apparatus described herein can be used to detect signal-producing events not related to biological reactions (e.g., a signal produced by a chemical transformation not involving a biological molecule).

In process 230, wire bonds are formed between the biological chip and the PCB, and a protective encapsulation is formed to protect the wire bonds. FIG. 3D is a cross-sectional view diagram illustrating wire bonds formed to electrically connect the biological chip and the printed circuit board (PCB). In FIG. 3D, a contact pad 122 on the biological chip is connected to a contact pad 112 on the PCB with a bond wire 114. The contact pad 122, contact pad 112, and bond wire 114 can be encapsulated in a wire bond protection structure 115.

Figure 3E:
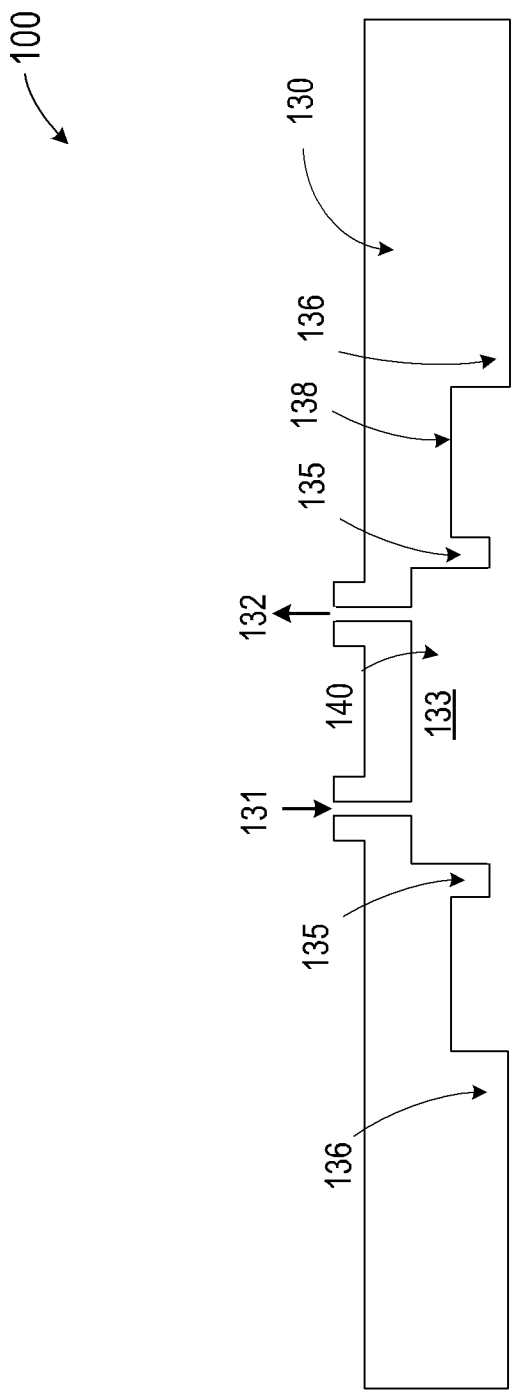

In process 250 of method 200, a microfluidic housing is provided. FIG. 3E is a cross-sectional view diagram illustrating a microfluidic housing according to some embodiments of the present invention. As shown in FIG. 1, microfluidic housing 130 is used to form a flow cell with the biological chip 120, and microfluidic housing 130 is also bonded to PCB 110 to provide a mechanical structure for the microfluidic apparatus.

The material for the microfluidic housing is compatible with the function of the flow cell, e.g., for handling of biological sample. The material is compatible with the biological chip and the PCB, and it is desirable to have compatible thermal expansion coefficients. In some embodiments, the microfluidic housing can be made from glass or plastic material, or other suitable material. As an example, the microfluidic housing can be made with molded plastic. The microfluidic housing can be formed separately from the above processes for chip bonding and PCB, and does not need to follow the above sequential order of the description of the method.

As shown in FIG. 3E, the microfluidic housing 130 has an inlet 131, an outlet 132, and a first cavity 133. The microfluidic housing 130 also has an inner sidewall 135 adjacent to the cavity 133, and the inner sidewall is used to attach to the biological chip to form a flow cell 140 with a hermetic seal. The flow cell 140 includes a channel formed by the cavity 133 between the microfluidic housing 130, inner sidewalls 135 of the microfluidic housing, and the biological chip 120.

As shown in FIG. 3E, the microfluidic housing 130 can also have an outer sidewall 136 for attaching to the PCB to provide mechanical support.

Figure 3F:
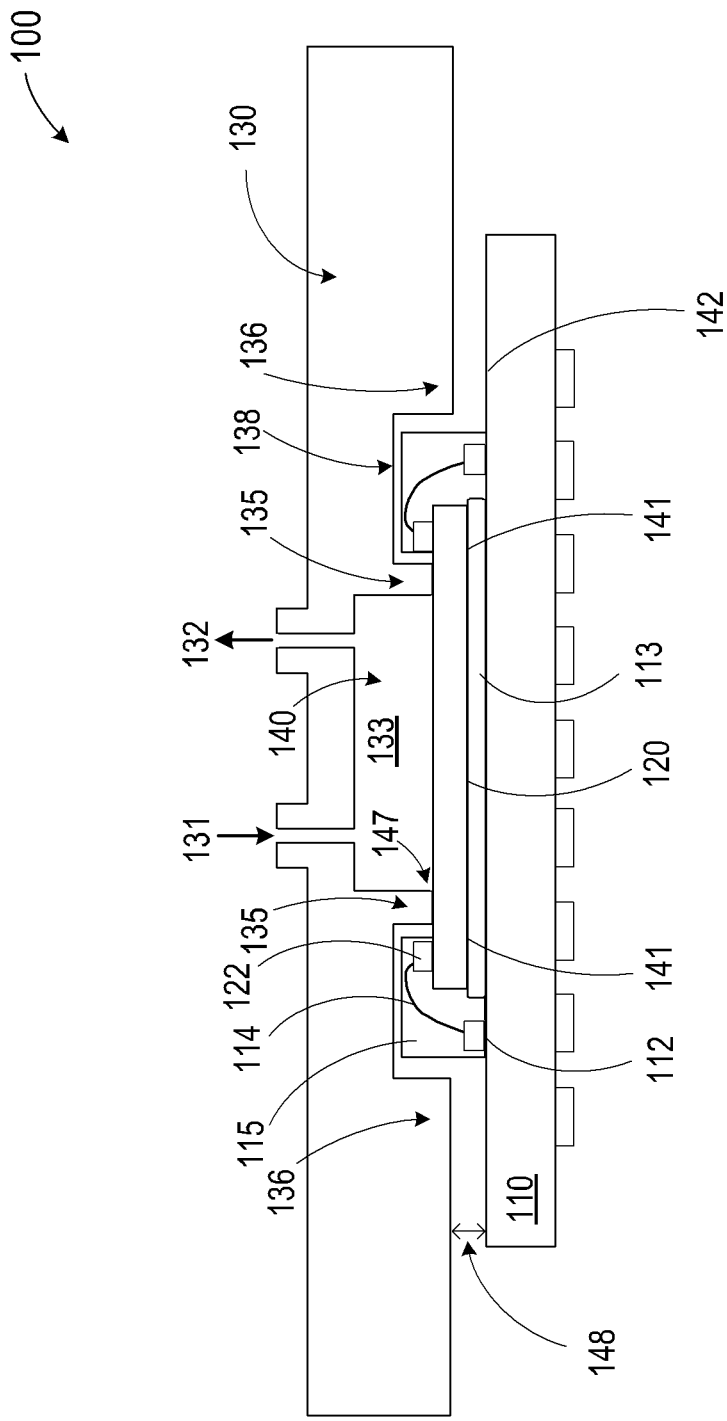

The shape and size of microfluidic housing 130 are designed to be assembled with the biological chip 120 and PCB 110, as illustrated in FIG. 3F. To demonstrate design considerations of the microfluidic housing, FIG. 3F shows that the microfluidic housing 130 is disposed on the biological chip 120, with the bottom surface of the inner sidewall 135 contacting the top surface of biological chip 120 without any adhesive material at an interface 147. In this configuration, there is a gap 148 between the bottom surface of the outer sidewall 136 of the microfluidic apparatus 130 and the top surface of the PCB 110. The height of the gap can be selected to account for variations and manufacturing error of the chip and the PCB. As explained below, this configuration and the selection of the glue materials can facilitate the formation of a hermetic bonding between the microfluidic housing 130 and the biologic chip 120, and the formation of bonding between the microfluidic housing 130 and the PCB 110 for providing mechanical strength of the device. In some embodiments, the height of the gap 148 can be around 10 μm, for example, 5 to 30 μm. In other embodiments, the height of the gap can be, for example, 30 to 50 μm, or more. The lateral dimension of the cavity 133 in the microfluidic housing 130 is determined by the width of the biologic chip 120 and the desired size of the flow cell.

Figure 3G:
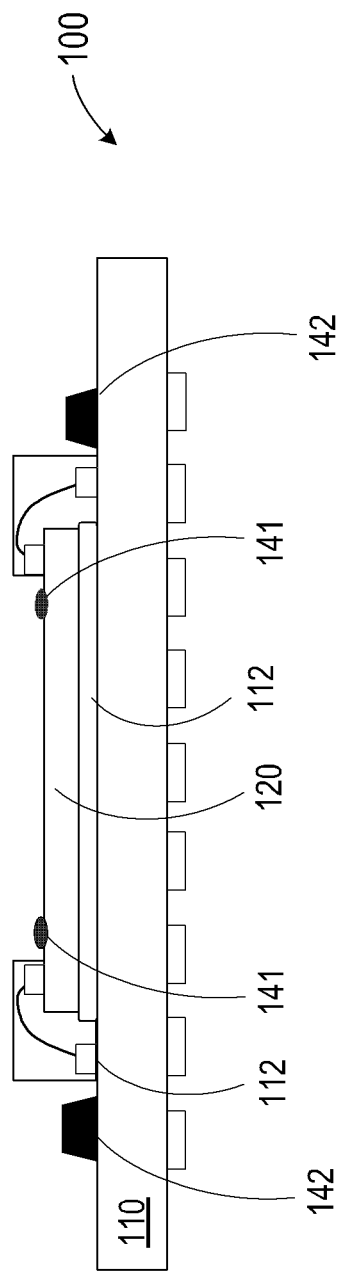
Figure 3H:
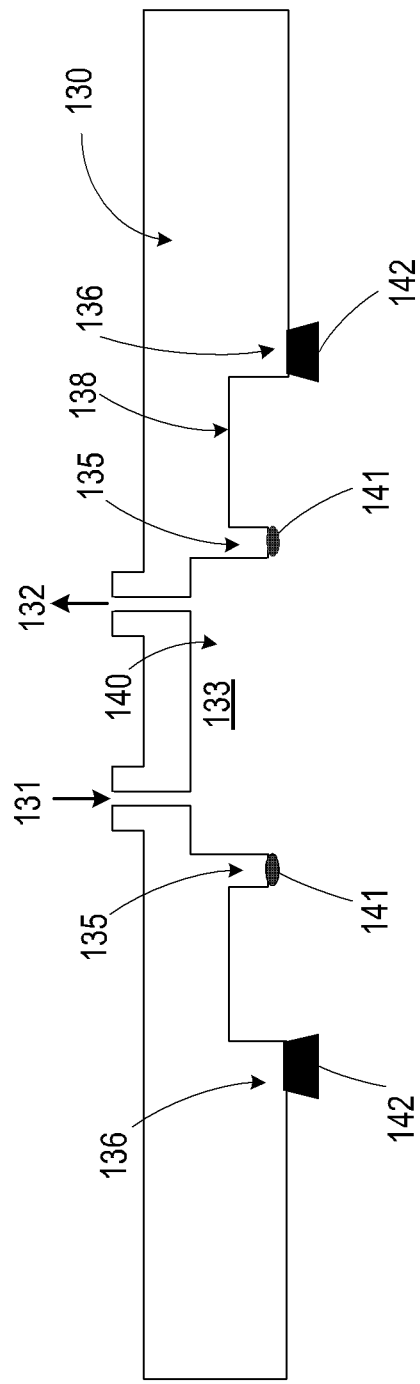

In process 250 of method 200, the adhesive layers are disposed for attaching the microfluidic housing 130 to the biological chip 120 and the PCB 110. In an embodiment, the adhesive layers can be applied to the top surface of the biological chip and PCB. Alternatively, the adhesive layers can be disposed at the bottom of the microfluidic housing 130, at the bottom surfaces. In a first embodiment, as shown in FIG. 3G, the first adhesive layer 141 is disposed on a top surface of biological chip 120, and the second adhesive layer 142 is disposed on a top surface of PCB 110. In a second embodiment, as shown in FIG. 3H, the first adhesive layer 141 and the second adhesive layer 142 are disposed on lower surfaces of the microfluidic housing 130. For example, the first adhesive layer 141 is disposed on a bottom surface of the inner sidewall 135 of biological chip 120, and the second adhesive layer 142 is disposed on a bottom surface of the outer sidewall 136 of biological chip 120.

In still another embodiment, the bonding can be formed between the microfluidic housing 130 and the biological chip 120, by disposing the first adhesive layer 141 either on the biological chip 120 or on the microfluidic housing 130 and then attaching the microfluidic housing 130 to the biological chip 120. Then, the second adhesive layer 142 can be disposed in the gap 148 between the microfluidic housing 130 and the PCB 110, as described above in connection to FIG. 3F, to form a second bonding between the microfluidic housing 130 and the PCB 110. The adhesive layers can be disposed in the desired positions using a glue dispensing device, for example, an automatic glue dispensing device.

Figure 3I:
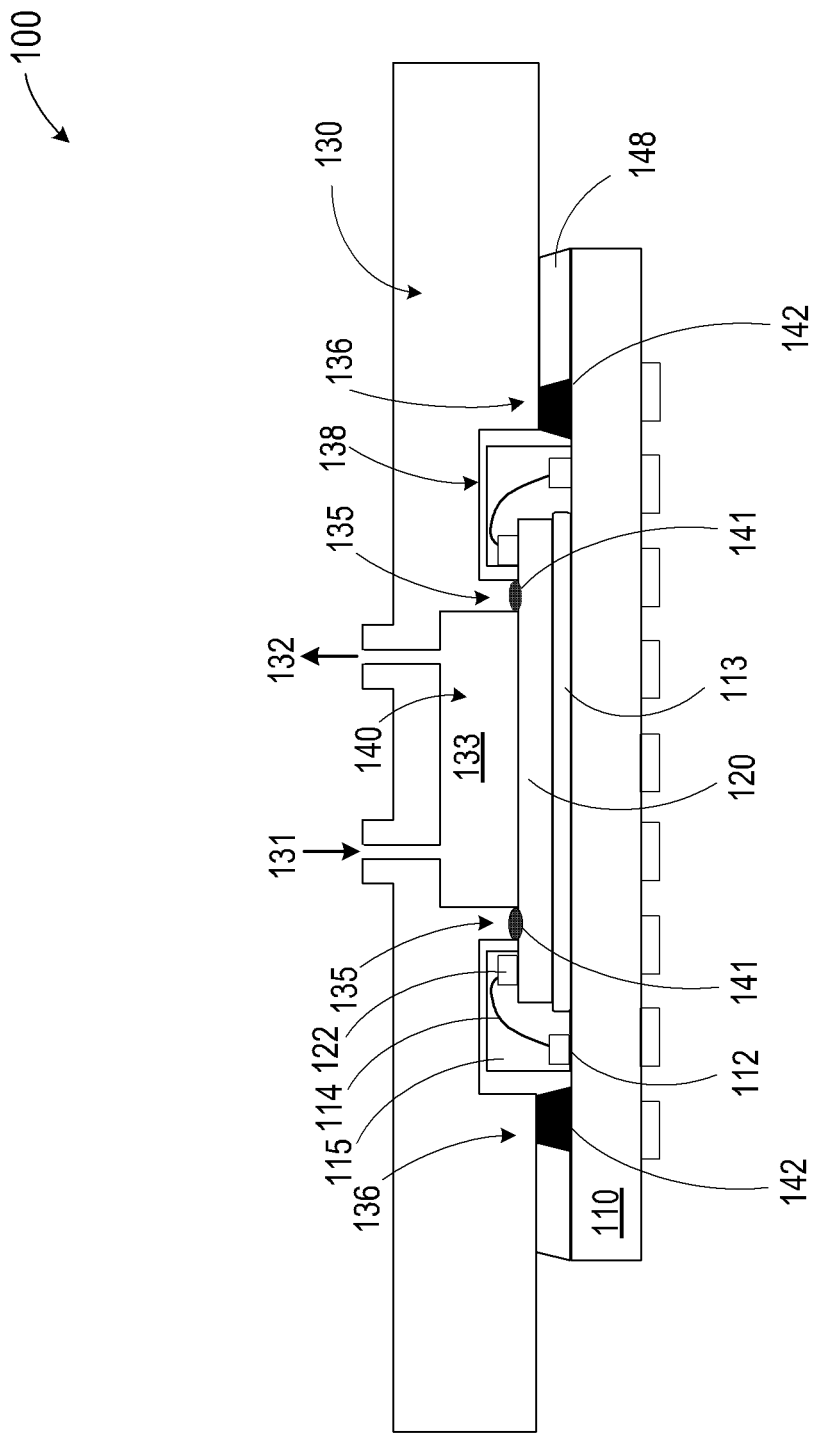

In process 260 of the method 200, the microfluidic housing 130 is attached to the biological chip 120 and the PCB 110, as illustrated in FIG. 3I. In some embodiments, both adhesive layers are disposed on the microfluidic housing 130 (as shown in FIG. H), or the two adhesive layers disposed on the biological chip 120 and the PCB 110, respectively (as shown in FIG. G). In these embodiments, the microfluidic housing 130 is picked up, placed on the biological chip 120 and the PCB 110, and the microfluidic housing 130 is pressed on the biological chip 120 and the PCB 110 to form the bonding. Subsequently, a curing process is carried out to harden the adhesive layers 141 and 142.

In still another embodiment, the bonding can be formed between the microfluidic housing 130 and the biological chip 120, by disposing the first adhesive layer 141 either on the biological chip 120 or on the microfluidic housing 130, followed by a pick and press process to attach the microfluidic housing 130 to the biological chip 120. A curing process can be carried out to solidify the first adhesive layer 141. Then, the second adhesive layer 142 can be disposed in the gap 148 between the microfluidic housing 130 and the PCB 110 to form a bonding after a curing process.

In embodiments of the invention, the materials and thicknesses and volume of the adhesive layers are selected to form a hermetic seal for the flow cell and to provide mechanical strength for the package. The first adhesive layer 141 forms a hermetic seal between the microfluidic housing 130 and the biological chip 120 that is air tight and liquid tight. Further, the first adhesive layer 141 is compatible with the materials used in the flow cell. On the other hand, the second adhesive layer 142 is configured to provide mechanical strength in the joint between the microfluidic housing 130 and the PCB 110.

In some embodiments, the first adhesive layer can be in solid form and can have a well-defined thickness that is substantially maintained through the curing process. On the other hand, the second adhesive layer is sufficiently thick and is in liquid form before curing, so that the second adhesive layer's bond line thickness is self-adjustable. In other words, it fills the space required by the structure of the microfluidic apparatus, which can include the first adhesive layer thickness, sensor thickness, die attach glue thickness, PCB surface unevenness, and the step of wire bond cavity in the microfluidic apparatus, etc. Here, the bond line thickness refers to the thickness of an adhesive layer between the bottom surface of the device structure above the adhesive layer and the top surface of the device structure below the adhesive layer. Depending on the context, the term "bond line thickness" can refer to a pre-cure bond line thickness or a post-cure bond line thickness.

In embodiments of the invention, the first adhesive layer 141 and the second adhesive layer 142 provide different functions. The first adhesive layer 141 can be made of a first material, or first glue, and the second adhesive layer 142 can be made of a second material, or second glue. In some embodiments, the first glue can be a solid glue before curing and substantially maintains its thickness after curing to ensure uniformity of the microfluidic apparatus. In other embodiments, the first glue is a compliant adhesive material after curing to accommodate thermal expansion mismatches during thermal cycles in the operation of the microfluidic apparatus. The second glue is malleable and able to change shape upon pressing in the assembly step of attaching microfluidic chip.

In some embodiments, the first adhesive layer 141 can be a compliant material, or stress compliant adhesive. In other words, the first adhesive, after curing, remains elastic to accommodate the mismatched thermal expansion between the biological chip and the microfluidic housing through thermal cycles during operation. For example, in certain biological applications, the device is subject to thermal cycling, e.g., between room temperature and a higher processing temperature, e.g., 65° C. or higher. The components of the microfluidic apparatus can have different materials with different thermal expansion coefficients. Therefore, in some embodiments, a compliant adhesive is used to form the first adhesive layer 141 between the microfluidic housing 130 and the biological chip 120. The compliant adhesive can absorb thermally induced dimensional variations between the microfluidic housing 130 and the biological chip 120. An example of a compliant adhesive material is urethane adhesive materials made by d. The urethane adhesives have low moisture vapor permeability and elastomeric properties and, once cured, provides a tough, flexible, tenacious bond. For example, Bostik 1100 FS adhesives are used in some embodiments. Of course, in embodiments of the invention, the first adhesive layer is not limited to the urethane adhesive. Other suitable compliant adhesive materials can also be used. Another example of compliant adhesive includes an epoxy resin, as described in U.S. Patent Publication No. US20070081317 to Choi, published Apr. 12, 2017, entitled "Circuit board mounting for temperature stress reduction," which is herein incorporated by reference in its entirety.

In some embodiments, the first adhesive layer 141 can be used to maintain a defined thickness before curing to maximize the flow cell's fluid field uniformity, since the first adhesive layer 141 is used to form the flow cell chamber between the microfluidic housing 130 and the biological chip 120. In these amendments, a dry film adhesive, such as die-attach film (DAF), can be used. Die attach films include epoxy adhesives which are film-based instead of paste-based and are often attached to the back of the wafer prior to dicing. The chip with the DAF on the back can be attached to a PCB. The DAF has advantages over an adhesive paste, because there is no re-shaping of the adhesive material from a drop-shape to a thin two-dimensional layer. Further, the process window for the film can be wider than for paste material, and assembly processes are simplified by the use of films.

Other examples of the die attach film can include materials such as an epoxy resin, a phenol resin, acrylic rubber, silica filler, or a combination thereof, and may be applied using a lamination technique. An example of die attach adhesive is ABLEBOND® 789-3™, made by Henkel Chemicals Company, Dusseldorf, Germany. However, any other suitable alternative materials and formation techniques may alternatively be used.

Examples of die attach films are described in U. S Patent Application Publication No. 20060154078 to Watanabe, published Jul. 13, 2006, entitled "Curing Resin Composition, Adhesive Epoxy Resin Paste, Adhesive Epoxy Resin Sheet, Conductive Connection Paste, Conductive Connection Sheet, And Electronic Component Joined Body," and U. S Patent Application Publication No. US 20080318364 to Foong, published Dec. 15, 2008, entitled "Process Applying Die Attach Film To Singulated Die," the content of both of which is incorporated by reference in their entirety. An example process flow for DAF assembly processing involves a bonding step followed by oven curing, e.g., for 60 minutes at 130° C. Alternatively, a UV curing process can also be used.

In some embodiments, the second glue can be a liquid epoxy, which is in liquid form after being dispensed on the PCB 110 and before curing. Examples of liquid epoxy is described in U. S Patent Application Publication No. 2018/0213635 to Baba, published Jul. 26, 2018, entitled "Resin Composition And Multilayer Substrate," U. S Patent Application Publication No. US 2018/0258325 to Taniquichi, published Sep. 13, 2018, entitled "Adhesive Layer And Adhesive Sheet," and U. S Patent Application Publication No. US2018/0291164 to Bank, published Oct. 11, 2018, entitled "Fast Cure Epoxy Composition For Use In High Throughput Manufacturing Processes," all of which is herein incorporated by reference in their entirety. A specific example of liquid epoxy is diglycidyl ethers of bisphenol A. Other examples of can include liquid epoxy materials made by Bostik, Inc. of Wauwatosa, WI, USA, which are humidity cured. Other providers of liquid epoxy include Norland NEA 123S or 123T made by Norland Products, Inc. in Cranbury, New Jersey, USA, Dymax Corporation, Torrignton, CT, and Electronic Materials Inc., Breckenridge, CO Another example of the compliant first adhesive is a pressure sensitive adhesive (PSA). Pressure-sensitive adhesive is an adhesive which forms a bond when pressure is applied. Some PSAs are based on an elastomer, e.g., elastomers based on acrylics. PSAs exhibit viscoelastic (viscous and elastic) properties, both of which are used for proper bonding.

As noted above in connection with FIG. 3F, when the microfluidic housing 130 is disposed on the biological chip 120, with the bottom surface of the inner sidewall 135 contacting the top surface of biological chip 120 without any adhesive material at an interface 147, there is a gap 148 between the bottom surface of the outer sidewall 136 of the microfluidic apparatus 130 and the top surface of the PCB 110. Therefore, when the microfluidic housing 130 is attached to the biological chip 120 and the PCB 110, and a curing process is carried out, as illustrated in FIG. 3I, the thickness of the second adhesive layer 142 is substantially equal to the thickness of the first adhesive layer 141 plus the height of the gap 148 described in FIG. 3F. In some embodiments, the thickness of the first adhesive layer 141 after curing can be in the range of 10 to 100 µm. The thickness can vary depending on fluid cell design. As described above, the height of the gap 148 can have range of about 5 to 50 µm. Therefore, the thickness of the second adhesive layer 142 after curing can be in the range of 15 to 150 µm.

In some embodiments, the microfluidic housing 130 can be attached to the biological chip 120 without using an external glue. For example, in some cases, the body material of the microfluidic housing or an embedded material in the microfluidic housing can be used as the adhesive material. For example, the microfluidic housing can be made of a plastic material, which may have a low melting temperature and can be melted to form a seal with the biological chip. In some embodiments, the microfluidic housing 130 can have an embedded adhesive material. For example, a groove can be formed in the sidewall of the microfluidic housing 130, and an adhesive material, e.g., DAF or other adhesive material, can be inserted in the groove.

In process 260 of method 200, the microfluidic housing is attached to the biological chip and PCB. FIG. 3I is a cross-sectional view diagram illustrating the microfluidic housing being attached to the biological chip and the PCB according to some embodiments of the present invention. Here, a standard pick, place, and press process can be used to attach the microfluidic housing to the biological chip and the PCB.

In process 270 of method 200, the assembled microfluidic apparatus is subject to a curing process to harden the adhesive layers. For polymer based adhesive material, curing refers to the toughening or hardening of a polymer material by cross-linking of polymer chains. Curing can occur with the application of external energy, such as electron beams, heat, or ultraviolet (UV) radiation.

In some embodiments, to minimize the stress on the first adhesive layer, the curing shrinkage of the first adhesive layer should not be more than the curing shrinkage of the second adhesive layer. Further, it can be desirable that the curing shrinkage of the second adhesive layer is more than the curing shrinkage of the first adhesive layer to ensure that the first adhesive layer can form a hermetic seal between the microfluidic housing and the biological chip. In some embodiments, the additional curing shrinkage of the second adhesive layer can be about 10% of the thickness of the first adhesive layer. In other embodiments, In some embodiments, the additional curing shrinkage of the second adhesive layer can be about 5-15% of the thickness of the first adhesive layer.

Figure 3J:
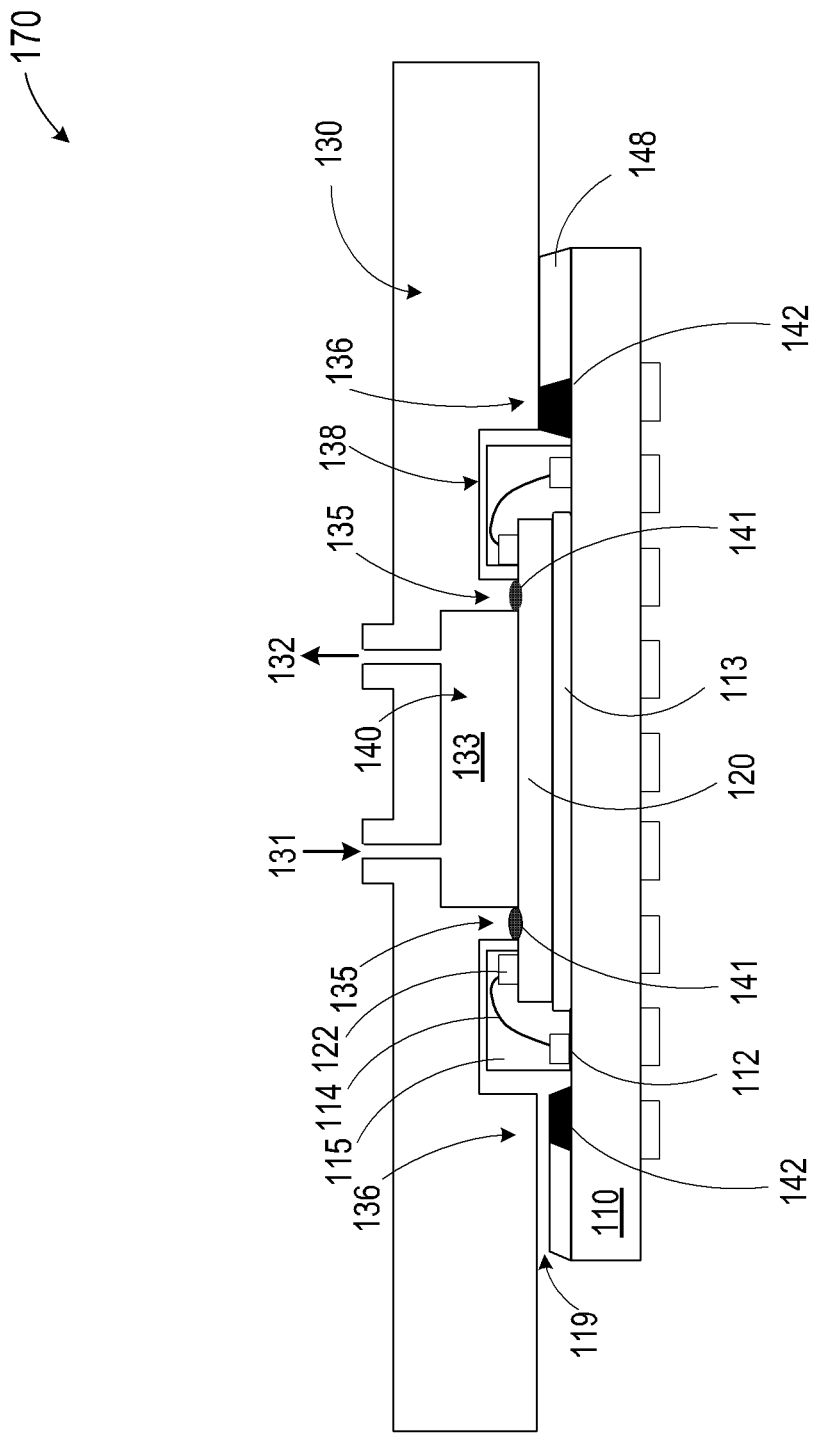
FIG. 3J is a simplified cross-sectional view diagram illustrating a microfluidic apparatus according to an alternative embodiment of the present invention.

FIG. 3J is a simplified cross-sectional view diagram illustrating a microfluidic apparatus according to an alternative embodiment of the present invention. As shown in FIG. 3J, microfluidic apparatus 170 is similar to the microfluidic apparatus 100 illustrated in FIGS. 1 and 3I, except for an opening 119 in the second adhesive layer 142. The opening 119 is designed to allow for testability of the hermeticity of first adhesive layer 141. For example, compressed air can be applied between the inlet 131 and outlet 132 of the microfluidic apparatus 170. Any leakage in the first adhesive layer 141 can be detected through the opening 119 in the second adhesive layer 142.

Figure 3K:
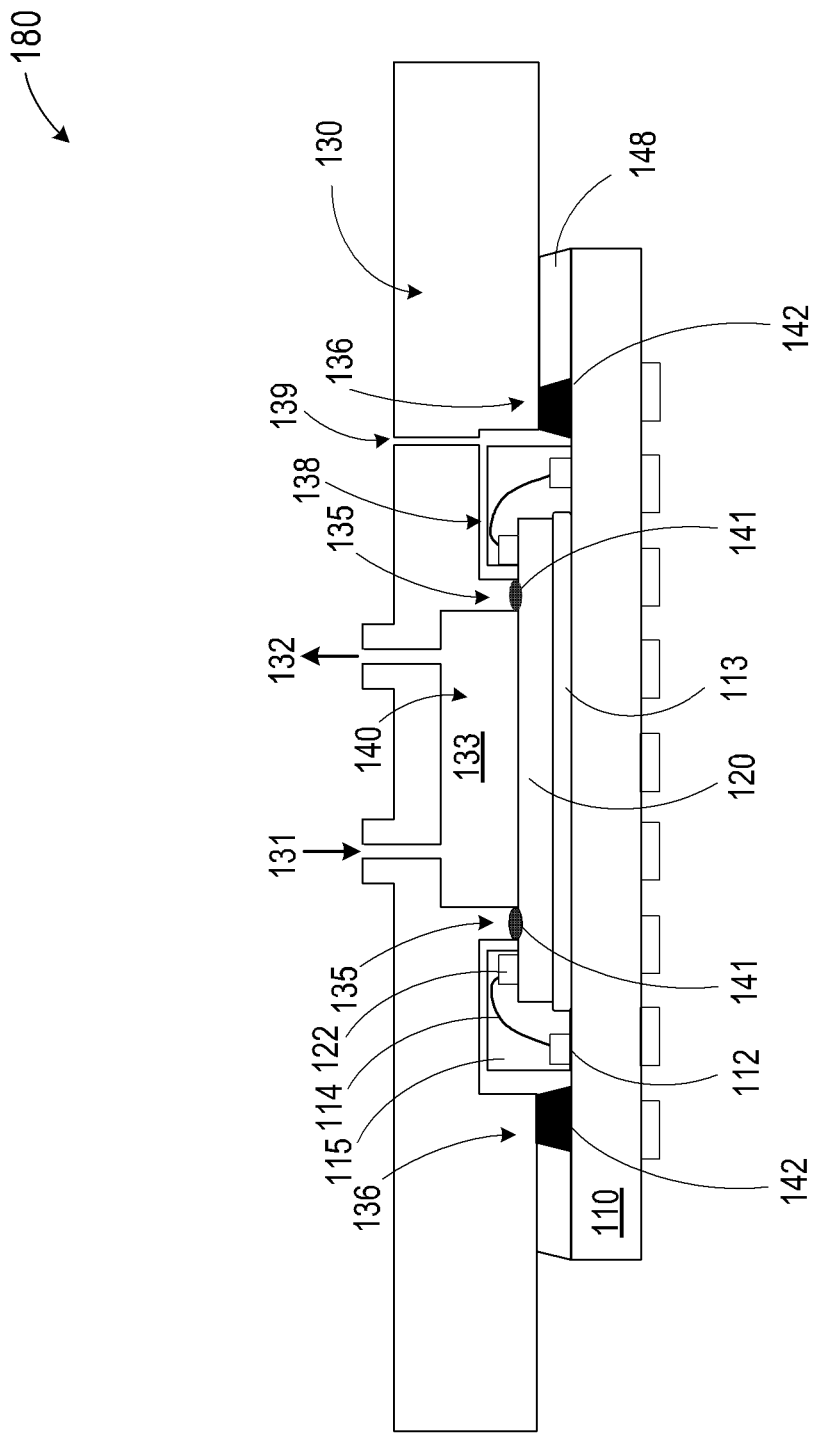
FIG. 3K is a simplified cross-sectional view diagram illustrating a microfluidic apparatus according to another embodiment of the present invention.

FIG. 3K is a simplified cross-sectional view diagram illustrating a microfluidic apparatus according to another embodiment of the present invention. As shown in FIG. 3K, microfluidic apparatus 180 is similar to the microfluidic apparatus 100 illustrated in FIGS. 1 and 3I, except for an opening 139 in the microfluidic housing 130. Similar to the opening 119 in FIG. 3J described above, the opening 139 in the microfluidic housing 130 in FIG. 3K is designed to allow for testability of the hermeticity of first adhesive layer. For example, compressed air can be applied between the inlet 131 and outlet 132 of the microfluidic apparatus 180. Any leakage in the first adhesive layer 141 can be detected through the opening 139 in the microfluidic housing 130.

Figure 4:
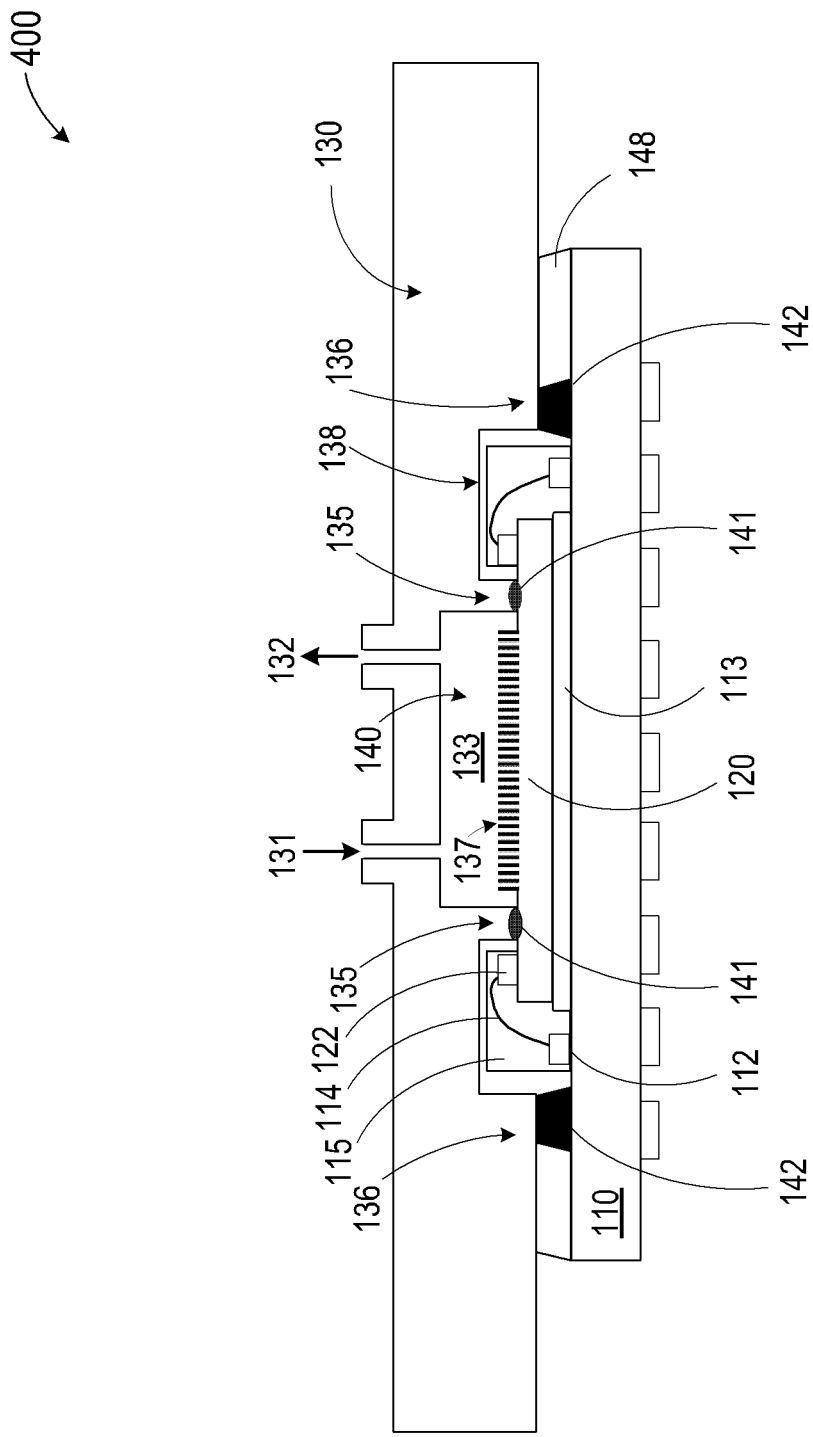
FIG. 4 is a cross-sectional view diagram illustrating biological samples introduced into the microfluidic apparatus for analysis according to some embodiments of the present invention.

The microfluidic apparatus is now ready to accept biological samples for analysis. FIG. 4 is a cross-sectional view diagram illustrating biological samples introduced into the microfluidic apparatus for analysis according to some embodiments of the present invention. The microfluidic apparatus 400 in FIG. 4, similar to microfluidic apparatus 100 in FIG. 1, shows biological samples 137 in the cavity 133 of the microfluidic apparatus.

As an example, a biological chip can detect a signal, and a processor can process the detected signal and decide to trigger an actuator. The microfluidic apparatus can include two kinds of adhesive layers. The first adhesive layer is used to attach a microfluidic housing to an IC chip, and the second adhesive layer is used to attach the microfluidic housing to a PCB.

As described above, FIG. 1 illustrates an example of a microfluidic apparatus having a single biological chip bonded to a PCB. However, the features described above are not limited to a microfluidic apparatus having a single chip, and the chip is not limited to be a biological chip. An example is described below.

Figure 5:
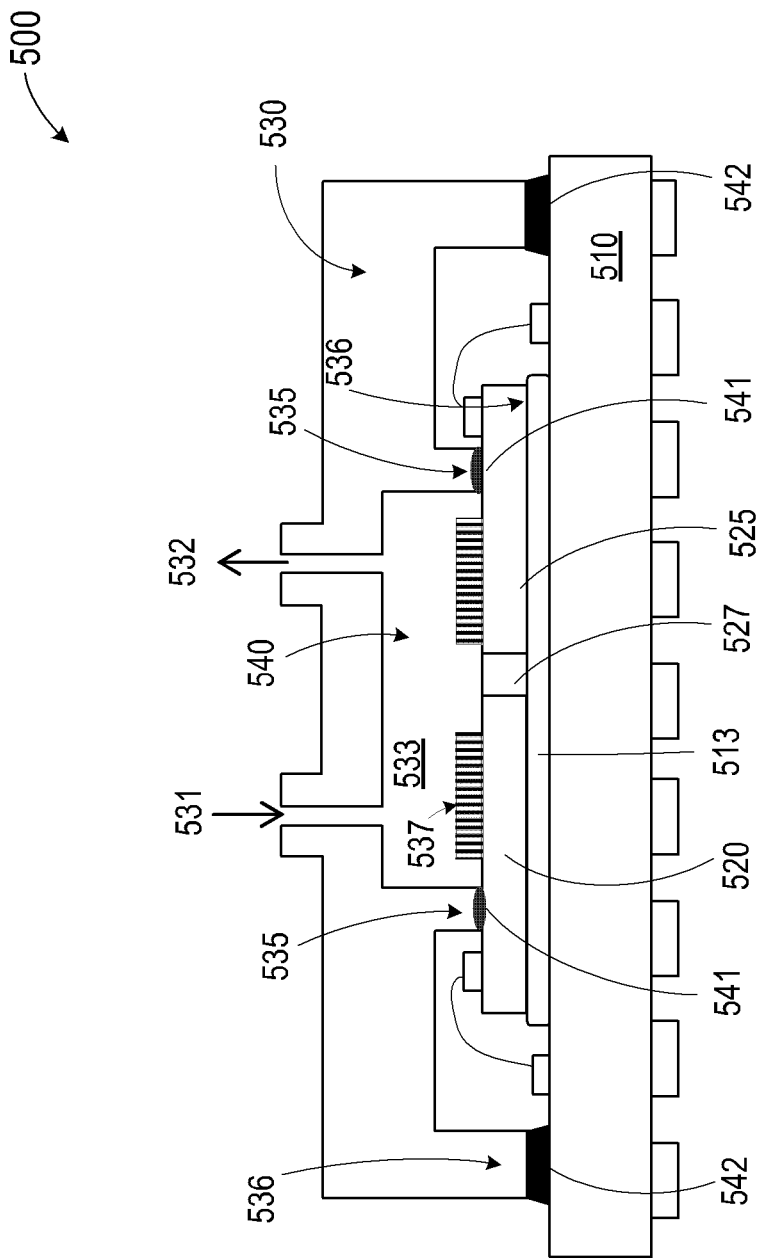
FIG. 5 is a simplified diagram illustrating a microfluidic apparatus having multiple devices attached to a PCB according to some embodiments of the present invention.

FIG. 5 is a simplified diagram illustrating a microfluidic apparatus having multiple chips attached to a PCB according to some embodiments of the present invention. As shown in FIG. 5, microfluidic apparatus 500 includes a PCB (printed circuit board) 510, a first chip 520 and a second chip 525 overlying the PCB, and a microfluidic housing 530 overlying the chips and the PCB. The first chip 520 can be a biological chip, similar to microfluidic apparatus 100 depicted in FIG. 1. The second chip 525 can be a second biological chip, similar to microfluidic apparatus 100 depicted in FIG. 1. Alternatively, the second chip 525 can be an integrated circuit (IC) chip, e.g., a processor chip, or a micro-electro-mechanical-system (MEMS) chip, e.g., an actuator.

The microfluidic housing 530 is attached to the chips 520 and 525 using a first adhesive layer 541 to form a flow cell, and the microfluidic housing 530 is attached to the PCB 510 using a second adhesive layer 542 to provide mechanical support. The chips 520 and 525 can be attached to the PCB 510, for example, using a die attach adhesive layer 513 that attaches the chips to the PCB. Further, a filling section 527 can be formed to fill in the space between chips 520 and 525.

In FIG. 5, the microfluidic housing 530 has an inlet 531, an outlet 532, and a first cavity 533. The microfluidic housing 530 can have an inner sidewall 535 adjacent to the cavity 533, and the inner sidewall is attached to the chips 520 and 525 using the first adhesive layer 541 to form a flow cell 540 with a hermetic seal. The flow cell 540 includes a channel formed by the cavity 533 between the microfluidic housing 530, inner sidewalls 535 of the microfluidic housing, and the chips 520 and 525. A biological sample 537 can be introduced through the inlet 531 into the cavity 533, where the chips 520 and 525 can determine the properties of the biological sample 537. Afterwards, the biological sample 537 can be removed from the cavity 533 through the outlet 532.

As shown in FIG. 5, the microfluidic housing 530 can also have an outer sidewall 536 attached to the PCB 510 using a second adhesive layer 542 to provide mechanical support. In some embodiments, the chips 520 and 525 are electrically coupled to the PCB 510 using wire bonds, similar to those described in FIG. 1. In this regard, the microfluidic housing 530 can also include second cavities for accommodating wire bonds.

The first adhesive layer 541 forms a hermetic seal between the microfluidic housing 530 and the chips 520 and 525 that is air tight and liquid tight. Further, the first adhesive layer 541 is compatible with the materials used in the flow cell and its operation. On the other hand, the second adhesive layer 542 is configured to provide mechanical strength in the joint between the microfluidic housing 530 and the PCB 510.

Figure 6:
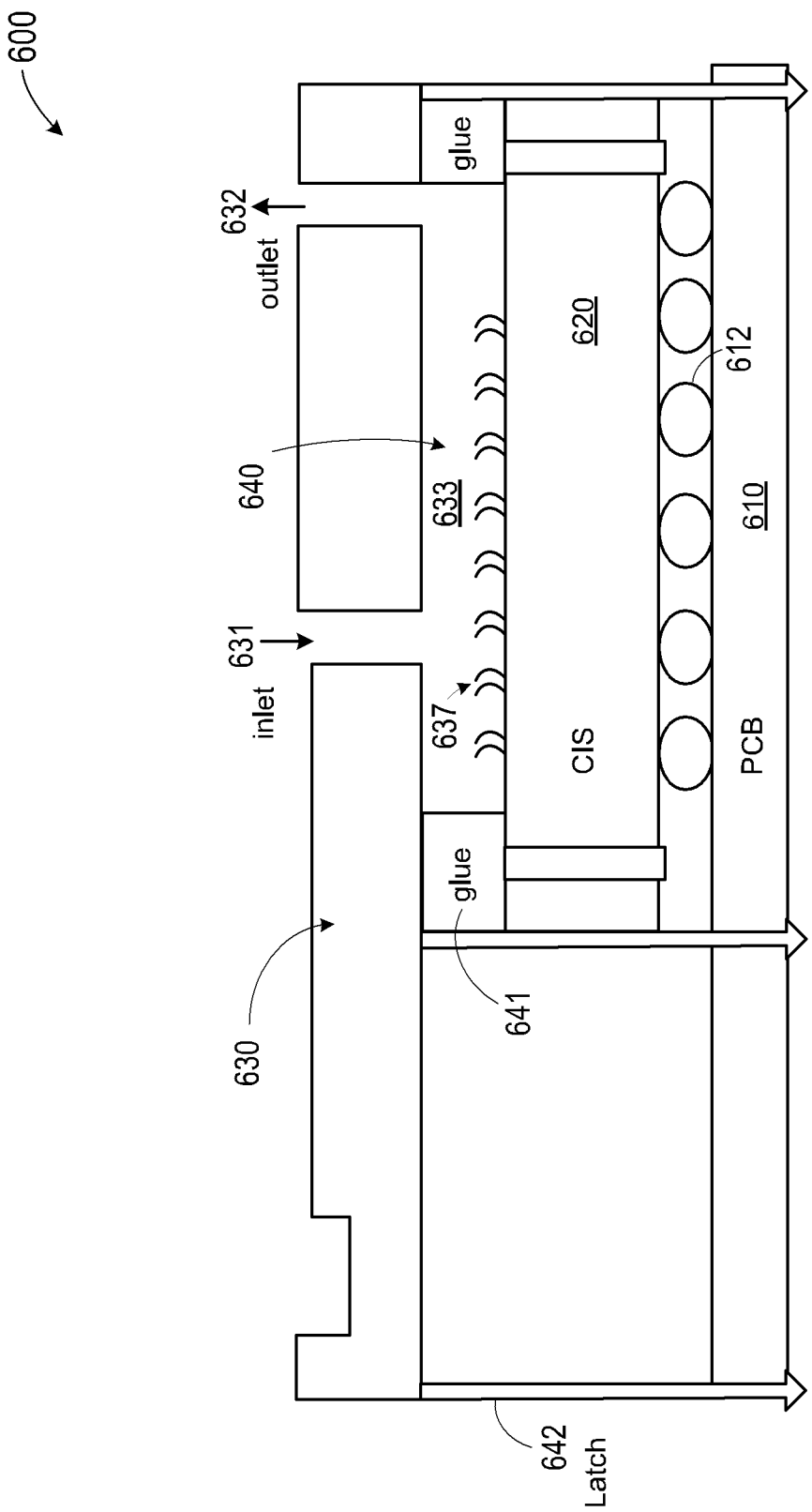
FIG. 6 is a simplified diagram illustrating a microfluidic apparatus formed by an alternative method according to some embodiments of the present invention.

FIG. 6 is a simplified diagram illustrating a microfluidic apparatus formed by an alternative method according to some embodiments of the present invention. As shown in FIG. 6, microfluidic apparatus 600 includes a PCB (printed circuit board) 610, a CMOS image sensor (CIS) 620 overlying the PCB 610, and a microfluidic housing 630 overlying the CMOS image sensor (CIS) 620 and the PCB 610. The microfluidic housing 630 is attached to the CMOS image sensor (CIS) 620 using glue 641 to form a flow cell, and the microfluidic housing 630 is attached to the PCB 610 using latches 642 to provide mechanical support. The CMOS image sensor 620 can be attached to the PCB 610 using solders 612.

In FIG. 6, the microfluidic housing 630 has an inlet 631, and an outlet 632. A cavity 633 is formed between the microfluidic housing 630 and the CMOS image sensor 620. The flow cell 640 includes a channel formed by the cavity 633 between the microfluidic housing 630, an inlet 631, and an outlet 632. A biological sample 637 can be introduced through the inlet 631 into the cavity 633, where the CMOS image sensor 620 can determine the properties of the biological sample 637. Afterwards, the biological sample 637 can be removed from the cavity 633 through the outlet 632.

In microfluidic apparatus 600, the glue 641 is used to form a hermetic seal of the flow cell, and comes in contact with biological samples. Therefore, the material of the glue 641 is compatible with the biological samples, the fluid used in the handling the biological samples, and the operational conditions. For example, in some embodiments, urethane glues, which are compatible to biological samples, can be used as glue 641 for forming the flow cell.

In microfluidic apparatus 600, latches 642 are used to attach the microfluidic housing 630 to the PCB 610 to provide mechanical support. In some embodiments, the latches can include snap click features, which can pass through apertures of PCB board. In this way, the snap click features can operate to provide or maintain a compression force between microfluidic apparatus 600 and PCB board 610, which in turn helps provide a seal between the microfluidic housing 630 and the CMOS image sensor (CIS) 620, which are bonded using glue 641.

Further, the above description of microfluidic apparatus 600 is not limited to the CMOS sensor. Other types of chips, such as sensor chips or biological sample manipulation chips, can also be used to implement the microfluidic apparatus. Similar to microfluidic apparatus 500 of FIG. 5, microfluidic apparatus 600 can also include multiple devices attached to the PCB.

Figure 7:
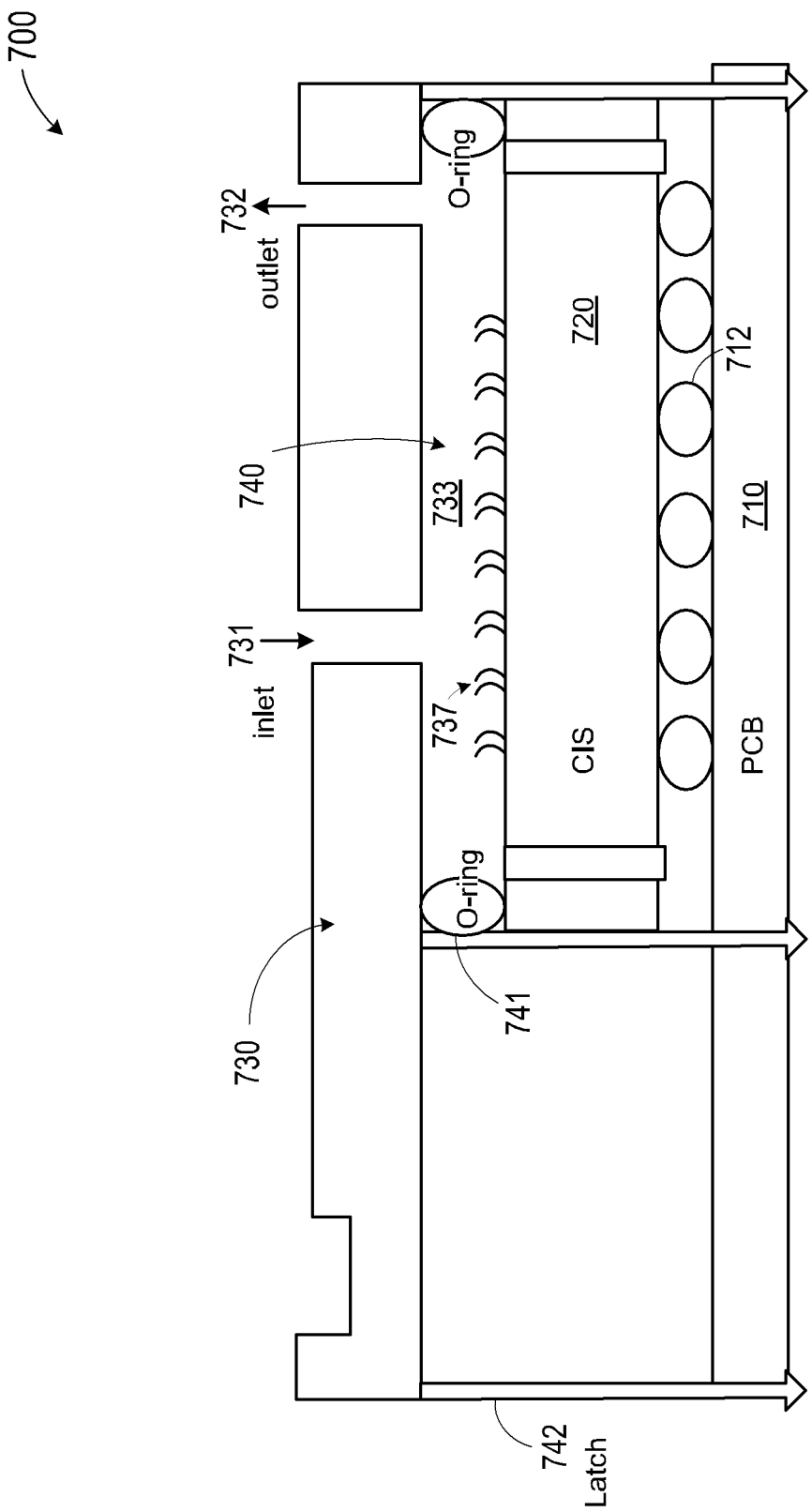
FIG. 7 is a simplified diagram illustrating a microfluidic apparatus formed by another method according to some embodiments of the present invention.

FIG. 7 is a simplified diagram illustrating a microfluidic apparatus formed by another method according to some embodiments of the present invention. Microfluidic apparatus 700 in FIG. 7 is similar to microfluidic apparatus 600 depicted in FIG. 6. One difference between microfluidic apparatus 700 and microfluidic apparatus 600 is that, in microfluidic apparatus 700, the glue used in microfluidic apparatus 600 to attach microfluidic housing to the CMOS image sensor is replaced by an O-ring. As shown in FIG. 7, microfluidic apparatus 700 includes a PCB (printed circuit board) 710, a CMOS image sensor (CIS) 720 overlying the PCB 710, and a microfluidic housing 730 overlying the CMOS image sensor (CIS) 720 and the PCB 710. The microfluidic housing 730 is attached to the CMOS image sensor (CIS) 720 using an O-ring 741 to form a flow cell, and the microfluidic housing 730 is attached to the PCB 710 using latches 742 to provide mechanical support. The CMOS image sensor 720 can be attached to the PCB 710 using solder 712.

In FIG. 7, the microfluidic housing 730 has an inlet 731 and an outlet 732. A cavity 733 is formed between the microfluidic housing 730 and the CMOS image sensor 720. The flow cell 740 includes a channel formed by the cavity 733 between the microfluidic housing 730, an inlet 731, and an outlet 732. A biological sample 737 can be introduced through the inlet 731 into the cavity 733, where the CMOS image sensor 720 can determine the properties of the biological sample 737. Afterwards, the biological sample 737 can be removed from the cavity 733 through the outlet 732.

An O-ring is a loop of elastomer material with a round cross-section, often designed to be seated in a groove and compressed during assembly between two or more parts, creating a seal at the interface. An elastomer refers to an elastic polymer, or a rubber-like solid with elastic properties. In microfluidic apparatus 700, the O-ring comes in contact with biological samples being analyzed by the CMOS sensor. Therefore, the material of the O-ring is compatible with the biological samples, the fluid used in the handling the biological samples, and the operational conditions. Further, the above description of microfluidic apparatus 700 is not limited to the CMOS sensor 720. Other types of chips, such as other types of sensors or biological sample manipulation chips, can also be used to implement microfluidic apparatus 700. Similar to microfluidic apparatus 500 of FIG. 5, microfluidic apparatus 700 can also include multiple devices attached to the PCB.

Some embodiments of the present invention can be used in the analysis of biological or chemical samples. The biological or chemical samples may include any of a number of components. For example, a sample may contain nucleic acid macromolecules (e.g., templates, DNA, RNA, etc.), proteins, and the like. The sample may be analyzed to determine a gene sequence, DNA-DNA hybridization, single nucleotide polymorphisms, protein interactions, peptide interactions, antigen-antibody interactions, glucose monitoring, cholesterol monitoring, and the like.

In some embodiments the biological sample can be a nucleic acid, such as DNA. See U.S. Pat. Nos. 8,778,849; 8,445,194; 9,671,344; 7,910,354; 9,222,132; 6,210,891; 6,828,100; 6,833,246; 6,911,345, and Pat. App. Pub. No. 2016/0237488, herein incorporated by reference in their entireties. Without limitation, the DNA biomolecule may be a DNA nanoball (single stranded concatemer) hybridized to labeled probes (e.g., in DNB sequencing by ligation or cPAL methods) or to complementary growing strands (e.g., in DNB sequencing by synthesis methods) or both; or a single DNA molecule (e.g., in single molecule sequencing); or to a clonal population of DNA molecules, such as is created in bridge PCR-based sequencing. Thus, reference to "a biomolecule," "a DNA macromolecule" or "a nucleic acid macromolecule" may encompass more than one molecule (e.g., a DNB associated with multiple growing complementary strands or a DNA cluster comprising clonal population of hundreds or thousands of DNA molecules). Exemplary methods for making DNBs (e.g., DNB libraries) and for making arrays of discrete spaced apart regions separated by inter-regional areas are well known in the art. See, for example, U.S. Pat. Nos. 8,133,719; 8,445,196; 8,445,197; and 9,650,673, herein incorporated by reference in their entireties. In some embodiments, DNBs or other macromolecules are immobilized on discrete spaced apart regions, or spots, through attractive noncovalent interactions (e.g., Van der Waal forces, hydrogen bonding, and ionic interactions). In some embodiments discrete spaced apart regions comprise functional moieties (e.g., amines). In some embodiments discrete spaced apart regions comprise capture oligonucleotides attached thereto, for binding template DNAs (e.g., DNBs). Generally the discrete spaced apart regions are arranged in a rectilinear pattern; however, regular arrays with other arrangements (e.g., concentric circles of regions, spiral patterns, hexagonal patterns, and the like) may be used.

In some embodiments, the nucleic acid macromolecules may be amplicons of genomic DNA fragments or a cDNA library. As used herein, an "amplicon" may be the product of amplification of a nucleic acid molecule, typically a fragment of genomic DNA or a cDNA library. Methods of amplification include, but are not limited to, rolling circle amplification, as described, for example, in U.S. Pat. No. 8,445,194 (herein incorporated by reference in its entirety), or bridge polymerase chain reaction (PCR), as described, for example, in U.S. Pat. No. 7,972,820, herein incorporated by reference in its entirety. The amplification may be performed before the nucleic acid is contacted with the biosensor, or in situ, as described, for example, in U.S. Pat. No. 7,910,354, herein incorporated by reference in its entirety.

For example, a biological sample, such as a DNA macromolecule, oligonucleotide, or nucleotide, associated with a fluorescent or chemiluminescent dye, may be placed above a photodiode 117. In the case of fluorescence, the dye may be illuminated by excitation light from an excitation light source. The excitation light may correspond to any suitable type or intensity of light, including, for example, visible light, infrared (IR), ultraviolet (UV), and the like. The excitation light may also come from any suitable source, such as light emitting diodes (LEDs), lamps, lasers, combinations thereof, and the like. When the dye is illuminated with excitation light at a certain wavelength, the biological sample may absorb the light, then emit light of a different wavelength. For example, the biological sample may absorb excitation light having a 450 nm wavelength, but emit light with a 550 nm wavelength. In other words, fluorescent light of a characteristic wavelength may be emitted when the dye is illuminated by light of a characteristic different wavelength (i.e., the excitation light source). Because excitation light is used to illuminate a dye resulting in fluorescence, however, it must be filtered out in order to take accurate measurements of fluorescence at the photodiode.

In the case of chemiluminescence, no excitation light source is needed for the photodiodes to detect emitted light. Instead, the biological sample may emit light due to a chemical or enzymatic reaction that may occur between the biological sample and the chemiluminescent dye (or other solution), causing light to be emitted due to breaking or forming chemical bonds (e.g., the action of a luciferase protein on a luciferin substrate).

For both fluorescence and chemiluminescence, the photodiodes may detect the intensity of the emitted light and transform it into an electronic signal based on the intensity of the light that may be provided to an external device via metal wiring. The external device may correlate the electronic signal to a particular wavelength and brightness, based on the electronic signal.

In some embodiments, the active spot or well on the surface of the biosensor and the nucleic acid macromolecule may be mutually configured such that each spot binds only one nucleic acid macromolecule. This may be achieved, for example, by contacting the surface with amplicons that correspond in size to the active spot (e.g., an amplicon having a diameter that is effectively as large or larger than the diameter of the active spot). See U.S. Pat. No. 8,445,194, herein incorporated by reference in its entirety. Alternatively, the active spot can be chemically adapted to bind a single DNA fragment, which may then be amplified to fill a larger region at and around the original binding site.

Some embodiments of the invention may be used to determine different labels corresponding to different wavelengths of light. The labels may be, for example, fluorescent, chemiluminescent or bioluminescent labels. For example, in gene sequencing (or DNA sequencing), embodiments of the invention may be used to determine the precise order of nucleotide bases within a nucleic acid macromolecule (e.g., a strand of DNA). The nucleotide bases (e.g., adenine (A), guanine (G), cytosine (C), or thymine (T)) may be labeled with a specific fluorescent label. Alternatively, one color, two color, or three color sequencing methods, for example, may be used.

With respect to fluorescence, each of the nucleotide bases may be determined in order by successively exciting the nucleic acid macromolecule with excitation light. The nucleic acid macromolecule may absorb the excitation light and transmit an emitted light of a different wavelength onto a biosensor as described herein. The biosensor may measure the wavelength of emitted light and intensity received by the photodiode. Each nucleotide (e.g., fluorescently labeled nucleotide), when excited by excitation light of a certain wavelength and/or intensity, may emit a certain wavelength of light and/or intensity into the photodiode, allowing identification of the presence of a particular nucleotide base at a particular position in the nucleic acid macromolecule. Once that particular nucleotide base has been determined, it may be removed from the nucleic acid macromolecule, such that the next successive nucleotide base may be determined according to a similar process.

A nucleic acid macromolecule may be labeled with one or more different fluorescent, chemiluminescent, or bioluminescent labels before or after attaching to the biosensor for any purpose. For example, the nucleic acid macromolecule may be hybridized with a labeled oligonucleotide probe or amplification primer. Alternatively, the nucleic acid macromolecule may be hybridized with a non-labeled oligonucleotide, which may then be ligated to a labeled probe, or extended using labeled nucleotide analogs. By way of illustration, the labeling may be done for the purpose of characterizing the nucleic acid macromolecule (for example, the presence of a single nucleotide polymorphism (SNP) associated with a disease), or for nucleic acid sequencing of all or a part of the nucleic acid macromolecule, as described above. DNA sequencing by probe hybridization is described, for example, in U.S. Pat. No. 8,105,771, herein incorporated by reference in its entirety. Sequencing by anchor probe ligation is described, for example, in U.S. Pat. No. 8,592,150, herein incorporated by reference in its entirety. Sequencing by synthesis is described, for example, in U.S. Pat. No. 7,883,869, herein incorporated by reference in its entirety. In general, sequencing by synthesis is a method in which nucleotides are added successively to a free 3' hydroxyl group provided by a sequencing primer hybridized to a template sequence, resulting in synthesis of a nucleic acid chain in the 5' to 3' direction. In one approach, another exemplary type of SBS, pyrosequencing techniques may be employed (Ronaghi et al., 1998, *Science* 281:363).

In some embodiments, the biosensor may be reversibly coupled to a flow cell (not shown). The nucleic acid macromolecule may be attached to the biosensor by contacting the biosensor with a liquid sample in the flow cell. The flow cell may include one or more flow channels that are in fluid communication with the reaction sites. In one example, the biosensor may be fluidically and electrically coupled to a bioassay system. The bioassay system may deliver reagents to the reaction sites according to a predetermined protocol and perform imaging events. For example, the bioassay system may direct solutions to flow along the reaction sites. The solution may include four types of nucleotides having the same or different fluorescent labels. In some embodiments, the bioassay system may then illuminate the reaction sites using an excitation light source. The excitation light may have a predetermined wavelength or wavelengths. The excited fluorescent labels may provide emission signals that may be detected by the photodiodes.

A user may prepare for sequencing by contacting a biosensor according to described embodiments with nucleic acid amplicons, or with a nucleic acid that is subsequently amplified, such that the nucleic acid macromolecule binds and is retained by the active spots or wells, and excess nucleic acid macromolecule may be washed away. The nucleic acid macromolecules may be contacted beforehand or in situ with a labeled reagent. The biosensor may then be operated as described herein to determine light emitted on or around nucleic acid macromolecules on the array. The light may be quantified, or it may be sufficient to determine in a binary fashion which of the nucleic acid macromolecules on the surface have been labeled with labels that emit at a particular wavelength. Different probes or different nucleic acid analogs may be used concurrently that have labels that emit light at different wavelengths, for example, to determine different bases at a particular position in the sequence, or to sequence multiple locations.

Although described herein with respect to a backside illumination CMOS sensor, it is contemplated that embodiments of the invention may be similarly applied to a frontside illumination CMOS sensor. Further, it is contemplated that embodiments of the invention may similarly apply to any suitable biosensor, such as those biosensors described in U.S. patent application Ser. No. 15/803,077, filed Nov. 3, 2017, which is herein incorporated by reference in its entirety.

The above description includes the methodologies, systems and/or structures and uses thereof in example aspects of the presently-described technology. Although various aspects of this technology have been described above with a certain degree of particularity, or with reference to one or more individual aspects, those skilled in the art could make numerous alterations to the disclosed aspects without departing from the spirit or scope of the technology hereof. Since many aspects can be made without departing from the spirit and scope of the presently described technology, the appropriate scope resides in the claims hereinafter appended. Other aspects are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular aspects and are not limiting to the embodiments shown. Unless otherwise clear from the context or expressly stated, any concentration values provided herein are generally given in terms of admixture values or percentages without regard to any conversion that occurs upon or following addition of the particular component of the mixture. To the extent not already expressly incorporated herein, all published references and patent documents referred to in this disclosure are incorporated herein by reference in their entirety for all purposes. Changes in detail or structure may be made without departing from the basic elements of the present technology as defined in the following claims.

What is claimed is:

1. A microfluidic apparatus, comprising:
a PCB (printed circuit board);
a biological chip overlying and attached on the PCB;
a microfluidic housing overlying and attached on the biological chip and attached on the PCB, the microfluidic housing having a first cavity, an inlet into the first cavity, an outlet out of the first cavity, and an inner sidewall extending downwardly from a main body of the microfluidic housing adjacent to and bounding the first cavity, the inner sidewall being attached to the biological chip using a first adhesive layer to form a flow cell with the first cavity extending along an upper surface of the biological chip, the microfluidic housing having an outer sidewall extending downwardly from the main body of the microfluidic housing and attached to the PCB using a second adhesive layer;
wherein:
a distance between a bottom surface of the outer sidewall and the PCB is greater than a distance between a bottom surface of the inner sidewall and the biological chip;
the second adhesive layer is thicker than the first adhesive layer;
the first adhesive layer comprises a first adhesive material; and
the second adhesive layer comprises a second adhesive material.

2. The apparatus of claim 1, wherein:
the first adhesive material is a solid before curing and substantially maintains its thickness after curing to provide accuracy and uniformity of a height of the microfluidic apparatus; and
the second adhesive material is a liquid before curing to adjust for variations in the distance between a bottom surface of the outer sidewall and the PCB.

3. The apparatus of claim 2, wherein the second adhesive material has a higher curing shrinkage than the first adhesive material.

4. The apparatus of claim 2:
the first adhesive material comprises a die attach film (DAF); and
the second adhesive material comprises liquid epoxy.

5. The apparatus of claim 1, wherein:
the first adhesive material is a compliant adhesive after curing to accommodate mismatched thermal expansion between the biological chip and the microfluidic housing through thermal cycles during operation; and
the second adhesive material is in liquid form before curing.

6. The apparatus of claim 5, wherein:
the first adhesive material comprises a compliant urethane adhesive material; and
the second adhesive material comprises liquid epoxy.

7. The apparatus of claim 5, wherein:
the first adhesive material comprises a pressure sensitive adhesive (PSA); and
the second adhesive material comprises liquid epoxy.

8. The apparatus of claim 1, wherein the first adhesive material is one of a heat curable, moisture curable, or ultraviolet illumination curable adhesive and the second adhesive material is a different one of the heat curable, moisture curable, or ultraviolet curable adhesive.

9. The apparatus of claim 1, wherein:
the apparatus further comprises bonding wires coupling the biological chip and the PCB; and
the microfluidic housing comprises one or more of second cavities between the inner sidewall and the outer sidewall accommodating the bonding wires coupling the biological chip and the PCB.

10. The apparatus of claim 1, wherein the second adhesive layer comprises an opening for hermeticity testing of the first adhesive layer.

11. The apparatus of claim 1, wherein the microfluidic housing comprises an opening for hermeticity testing of the first adhesive layer.

12. A microfluidic apparatus, comprising:
a PCB (printed circuit board);
a biological chip overlying and attached on the PCB;
a microfluidic housing overlying and attached on the biological chip and attached on the PCB, the microfluidic housing having a first cavity extending along an upper surface of the biological chip;
a first adhesive layer and a second adhesive layer, the first adhesive layer attaching the microfluidic housing to the biological chip and the second adhesive layer attaching the microfluidic housing to the PCB, the second adhesive layer being thicker than the first adhesive layer;
wherein the first adhesive layer comprises a first adhesive material, the second adhesive layer comprises a second adhesive material.

13. The apparatus of claim 12, wherein the microfluidic housing comprises an inlet, an outlet, the microfluidic housing having an inner sidewall adjacent to the first cavity and the inner sidewall being attached to the biological chip using the first adhesive layer to form a flow cell, the microfluidic housing having an outer sidewall attached to the PCB using the second adhesive layer.

14. The apparatus of claim 13, wherein:
the first adhesive material is a solid before curing and substantially maintains its thickness after curing to provide accuracy and uniformity of a height of the microfluidic apparatus; and
the second adhesive material is a liquid before curing to adjust for distance variations between a bottom surface of the outer sidewall and the PCB.

15. The apparatus of claim 12, wherein:
the first adhesive material is a compliant adhesive after curing to accommodate mismatched thermal expansion between biological chip and the microfluidic housing through thermal cycles during operation; and
the second adhesive material is in liquid form before curing.

16. A method for making a microfluidic apparatus, comprising:
providing a PCB (printed circuit board);
attaching a biological chip to the PCB;

providing a microfluidic housing;

disposing first and second adhesive materials, the first adhesive material for attaching the microfluidic housing to the biological chip and the second adhesive material for attaching the microfluidic housing to the PCB, wherein the second adhesive material is in liquid form before curing;

with the biological chip attached to the PCB, attaching the microfluidic housing to the biological chip and the PCB by pressing the microfluidic housing onto the biological chip and the PCB, with using the first adhesive material attaching the microfluidic housing to the biological chip and the second adhesive material attaching the microfluidic housing to the PCB; and curing the first and second adhesive materials to form first and second adhesive layers, respectively, the second adhesive layer being thicker than the first adhesive layer.

17. The method of claim 16, wherein the microfluidic housing comprises an inlet, an outlet, and a first cavity, the microfluidic housing having an inner sidewall adjacent to the first cavity and the inner sidewall being attached to the biological chip using a first adhesive layer to form a flow cell, the microfluidic housing having an outer sidewall attached to the PCB using a second adhesive layer.

18. The method of claim 17, wherein:

the first adhesive material is a solid before curing and substantially maintains its thickness after curing to provide accuracy and uniformity of a height of the microfluidic apparatus; and the second adhesive material is a liquid before curing to adjust for distance variations between a bottom surface of the outer sidewall and the PCB.

19. The method of claim 18, wherein:

the first adhesive material comprises a die attach film (DAF); and the second adhesive material comprises liquid epoxy.

20. The method of claim 18, wherein the second adhesive material has a higher curing shrinkage than the first adhesive material.

21. The method of claim 16, wherein:

the first adhesive material is a compliant adhesive after curing to accommodate mismatched thermal expansion between biological chip and the microfluidic housing through thermal cycles during operation; and the second adhesive material is in liquid form before curing.

22. The method of claim 21, wherein:

the first adhesive material comprises a compliant urethane adhesive material; and the second adhesive material comprises liquid epoxy.

23. The method of claim 21, wherein:

the first adhesive material comprises a pressure sensitive adhesive (PSA); and the second adhesive material comprises liquid epoxy.

* * * * *

UNITED STATES PATENT AND TRADEMARK OFFICE
CERTIFICATE OF CORRECTION

| | | |
|---|---|---|
| PATENT NO. | : 12,134,093 B2 | Page 1 of 1 |
| APPLICATION NO. | : 17/293389 | |
| DATED | : November 5, 2024 | |
| INVENTOR(S) | : Liang Wang, Cheng Frank Zhong and Shifeng Li | |

It is certified that error appears in the above-identified patent and that said Letters Patent is hereby corrected as shown below:

In the Claims

In Column 21, Line 11, Claim 16:
After "with" Delete "using".

Signed and Sealed this
Thirty-first Day of December, 2024

Derrick Brent
*Acting Director of the United States Patent and Trademark Office*